US012555938B2

(12) United States Patent
Saito et al.

(10) Patent No.: US 12,555,938 B2
(45) Date of Patent: Feb. 17, 2026

(54) CONNECTOR

(71) Applicant: JAPAN AVIATION ELECTRONICS INDUSTRY, LIMITED, Tokyo (JP)

(72) Inventors: Yuichi Saito, Tokyo (JP); Yukitaka Tanaka, Tokyo (JP); Gota Kameyama, Tokyo (JP); Yukiko Sato, Tokyo (JP); Hiroaki Kuribayashi, Tokyo (JP)

(73) Assignee: JAPAN AVIATION ELECTRONICS INDUSTRY, LIMITED, Tokyo (JP)

( * ) Notice: Subject to any disclaimer, the term of this patent is extended or adjusted under 35 U.S.C. 154(b) by 378 days.

(21) Appl. No.: 18/242,700

(22) Filed: Sep. 6, 2023

(65) Prior Publication Data

US 2024/0136744 A1 Apr. 25, 2024
US 2024/0235079 A9 Jul. 11, 2024

(30) Foreign Application Priority Data

Oct. 20, 2022 (JP) ................................. 2022-168285

(51) Int. Cl.
*H01R 12/75* (2011.01)
*H01R 13/424* (2006.01)
(Continued)

(52) U.S. Cl.
CPC ........... *H01R 12/75* (2013.01); *H01R 13/424* (2013.01); *H01R 13/502* (2013.01); *H01R 12/7047* (2013.01)

(58) Field of Classification Search
CPC .... H01R 12/75; H01R 13/424; H01R 13/502; H01R 12/7047; H01R 13/6581;
(Continued)

(56) References Cited

U.S. PATENT DOCUMENTS 10,985,479 B2 4/2021 Buck et al.
11,081,821 B2 8/2021 Blackburn et al.
(Continued)

FOREIGN PATENT DOCUMENTS

| | | | |
|---|---|---|---|
| CN | 111952806 | A | 11/2020 |
| JP | 5088427 | B2 | 9/2012 |
| TW | I763704 | B | 5/2022 |

OTHER PUBLICATIONS

Taiwanese Office Action dated Jul. 26, 2024 (and English translation thereof), issued in counterpart Taiwanese Application No. 112134630.

*Primary Examiner* — Joseph Ortega
(74) *Attorney, Agent, or Firm* — Holtz, Holtz & Volek PC

(57) ABSTRACT

A connector comprises a housing, a terminal and a shell. The terminal has a held portion held by the housing, a first portion extending rearward from the held portion and a second portion extending forward from the held portion. The first portion has a connectable portion configured to be connected to a first object. The second portion has a resiliently deformable support portion and a contact portion supported by the support portion. The contact portion is pressed against a second object when the connector is fixed on the second object. The shell has a first upper plate and a second upper plate which is located below the first upper plate. The first upper plate covers the first portion of the terminal from above. The second upper plate covers the second portion of the terminal from above.

9 Claims, 13 Drawing Sheets

(51) Int. Cl.
*H01R 13/502* (2006.01)
*H01R 12/70* (2011.01)

(58) Field of Classification Search
CPC .. H01R 12/714; H01R 12/7052; H01R 13/40; H01R 13/02; H01R 13/6473
See application file for complete search history.

(56) References Cited

U.S. PATENT DOCUMENTS

| | | | | |
|---|---|---|---|---|
| 11,462,845 | B2 | 10/2022 | Lee et al. | |
| 2007/0087607 | A1* | 4/2007 | Nagano .............. | H01R 13/5213 439/288 |
| 2012/0225575 | A1 | 9/2012 | Tagawa et al. | |
| 2020/0083627 | A1* | 3/2020 | Peloza ............... | H01R 13/6587 |
| 2021/0328383 | A1* | 10/2021 | Kimura .................. | H01R 12/75 |

* cited by examiner

CONNECTOR

CROSS REFERENCE TO RELATED APPLICATIONS

This application is based on and claims priority under 35 U.S.C. § 119 to Japanese Patent Application No. JP 2022-168285 filed Oct. 20, 2022, the content of which is incorporated herein in its entirety by reference.

BACKGROUND OF THE INVENTION

This invention relates to a so-called compression type connector which is configured to be pressed against an object to be connected to the object.

For example, this type of connector is disclosed in JP5088427B (Patent Document 1), the content of which is incorporated herein by reference.

Referring to FIG. 25, Patent Document 1 discloses a connector which can be fixed on a case (object) 96 formed with a conductive path 97. The connector 90 comprises a terminal 92 connected to a cable 98. The terminal 92 has a contact point (contact portion) 93 which is supported so that it is vertically movable. When the connector 90 is fixed on the object 96, the contact portion 93 is pressed against the conductive path 97 of the object 96 and is brought into contact with the conductive path 97. As a result, the object 96 and the cable 98 are electrically connected with each other. As described above, the connector 90 of Patent Document 1 is a compression type connector which is configured to be pressed against the object 96 to be connected to the object 96.

There is a need for improvement of transmission characteristics of a compression type connector.

SUMMARY OF THE INVENTION

It is therefore an object of the present invention to provide a compression type connector which can be improved in transmission characteristics.

The inventors of the present invention have studied transmission characteristics of a predetermined compression type connector. This predetermined connector comprised a terminal extending along a front-rear direction, a housing holding a held portion of the terminal and a shell covering the terminal. The terminal had a first portion and a second portion which were located on opposite sides of the held portion in the front-rear direction, respectively. The first portion was a part configured to be connected to a first object such as a cable. The second portion had a contact portion which was pressed against a second object such as a circuit board when the connector was fixed on the second object. The study has revealed that transmission characteristics tend to be degraded if a too long distance is formed between the second portion and a part of the shell, namely a second upper plate, which covers the second portion. It has been also acknowledged that when the second upper plate is made nearer to the second portion, impedance of the first portion, impedance of the second portion and impedance of the held portion are matched to each other so that transmission characteristics can be improved. The present invention provides the connector described below based on the aforementioned knowledge.

An aspect of the present invention provides a connector connectable to a first object and fixable on a second object so that the connector is unmovable relative to the second object. The connector comprises a housing, two or more terminals and a shell. The housing has a holding portion. The terminals are arranged in a pitch direction. Each of the terminals has a held portion, a first portion and a second portion. For each of the terminals, the held portion is held by the holding portion, the first portion extends rearward from the holding portion in a front-rear direction perpendicular to the pitch direction, and the second portion extends forward from the holding portion. The first portion has a connectable portion. The connectable portion is configured to be connected to the first object. The second portion has a support portion and a contact portion. The support portion is resiliently deformable. The contact portion is supported by the support portion and is pressed against the second object when the connector is fixed on the second object. The shell covers, at least in part, an upper surface of the housing. The shell has a first upper plate, a second upper plate and a coupling portion. The second upper plate is coupled to the first upper plate via the coupling portion. The first upper plate extends over the two or more terminals along the pitch direction and covers the first portions of the terminals from above in an upper-lower direction perpendicular to both the pitch direction and the front-rear direction. The second upper plate extends over the two or more terminals along the pitch direction and covers the second portions of the terminals from above. The second upper plate is located below the first upper plate.

According to the connector of an aspect of the present invention, the contact portion of the terminal is pressed against the second object when the connector is fixed on the second object. Thus, the connector of an aspect of the present invention is a compression type connector.

The first upper plate of the shell covers the first portions of the terminals, which are configured to be connected to the first object, from above. The second upper plate of the shell is located below the first upper plate and covers the second portions of the terminals, which are provided with the contact portions of the terminals, from above. In other words, the second upper plate is provided so that it is close to the second portions. According to this structure, impedance of the first portion, impedance of the second portion and impedance of the held portion are matched to each other, and thereby transmission characteristics can be improved. As described above. an aspect of the present invention provides a compression type connector which can be improved in transmission characteristics.

An appreciation of the objectives of the present invention and a more complete understanding of its structure may be had by studying the following description of the preferred embodiment and by referring to the accompanying drawings.

Figure 1:
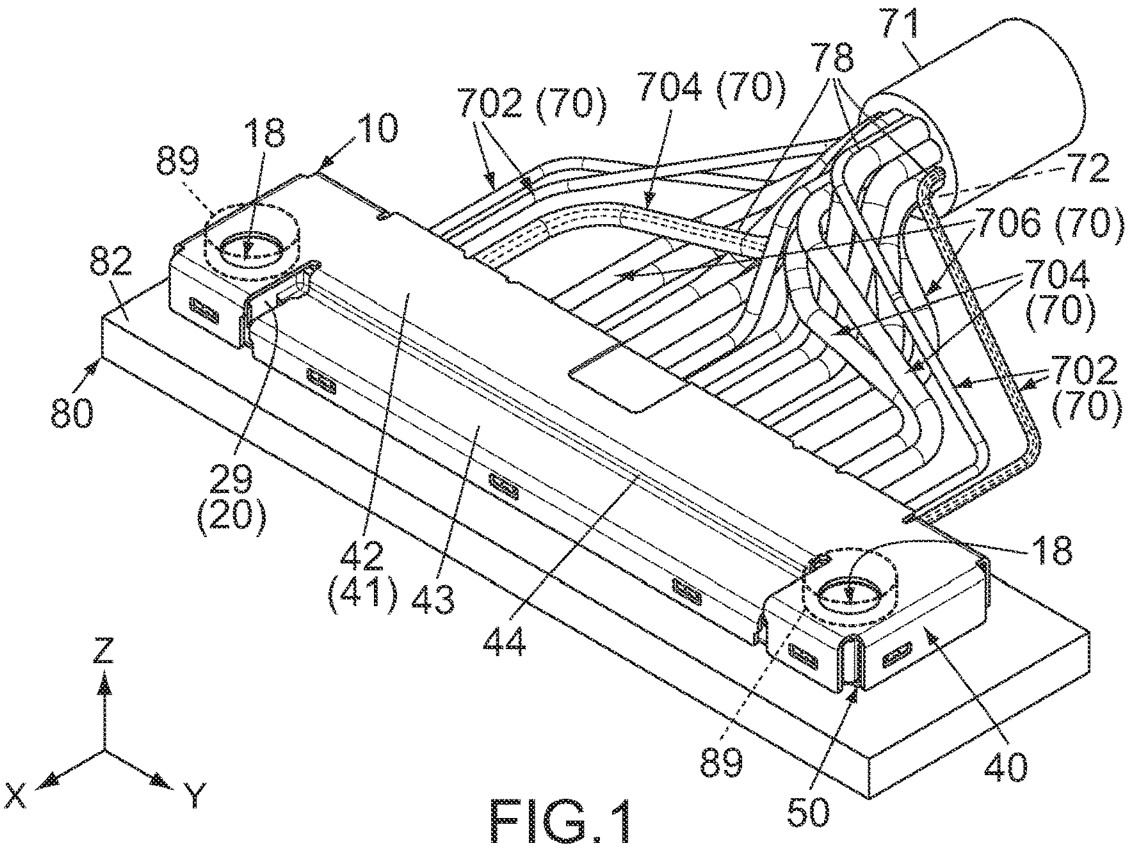
FIG. 1 is a perspective view showing a connector according to an embodiment of the present invention, wherein the connector is connected to cables and is fixed on a circuit board, outlines of screws are illustrated with dashed line, and outlines of hidden core wires of two cables are illustrated with dashed line.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

Referring to FIG. 1, a connector 10 according to an embodiment of the present invention is a so-called one-piece connector. The connector 10 is connectable to a first object 70 and is fixable on a second object 80 so that the connector 10 is unmovable relative to the second object 80. The first object 70 of the present embodiment is one or more cables 70. The connector 10 forms a harness together with the cables 70. The second object 80 of the present embodiment is a circuit board 80. However, the present invention is not limited to the present embodiment but is applicable to various connectors. For example, the first object 70 may be a member such as a paddle card, a flexible printed circuits (FPC) board, a flexible flat cable (FFC) and a mating connector. The second object 80 is not specifically limited, provided that the connector 10 can be fixed thereon by a fixing mechanism. For example, the second object 80 may be a member such as an FPC board, an FFC and another connector on which the connector 10 is fixable.

Hereafter, explanation will be made about the first object (cables) 70 of the present embodiment.

According to the present embodiment, seventeen of the cables 70 are provided. Each of the cables 70 is connected to a rear end of the connector 10 in a front-rear direction. The front-rear direction of the present embodiment is the X-direction. In the present embodiment, "forward" means the positive X-direction, and "rearward" means the negative X-direction. All the cables 70 are bound together into a composite cable 71 which is connected to a first electronic device (not shown). However, the present invention is not limited thereto. For example, the cables 70 may be bound into a single cable as necessary. The number of the cables 70 may be one.

The cables 70 of the present embodiment include four discrete cables 702, three discrete cables 704 and ten coaxial cables (predetermined cables) 706. Each of the predetermined cables 706 of the present embodiment is the coaxial cable 706. However, the present invention is not limited thereto.

Figure 8:
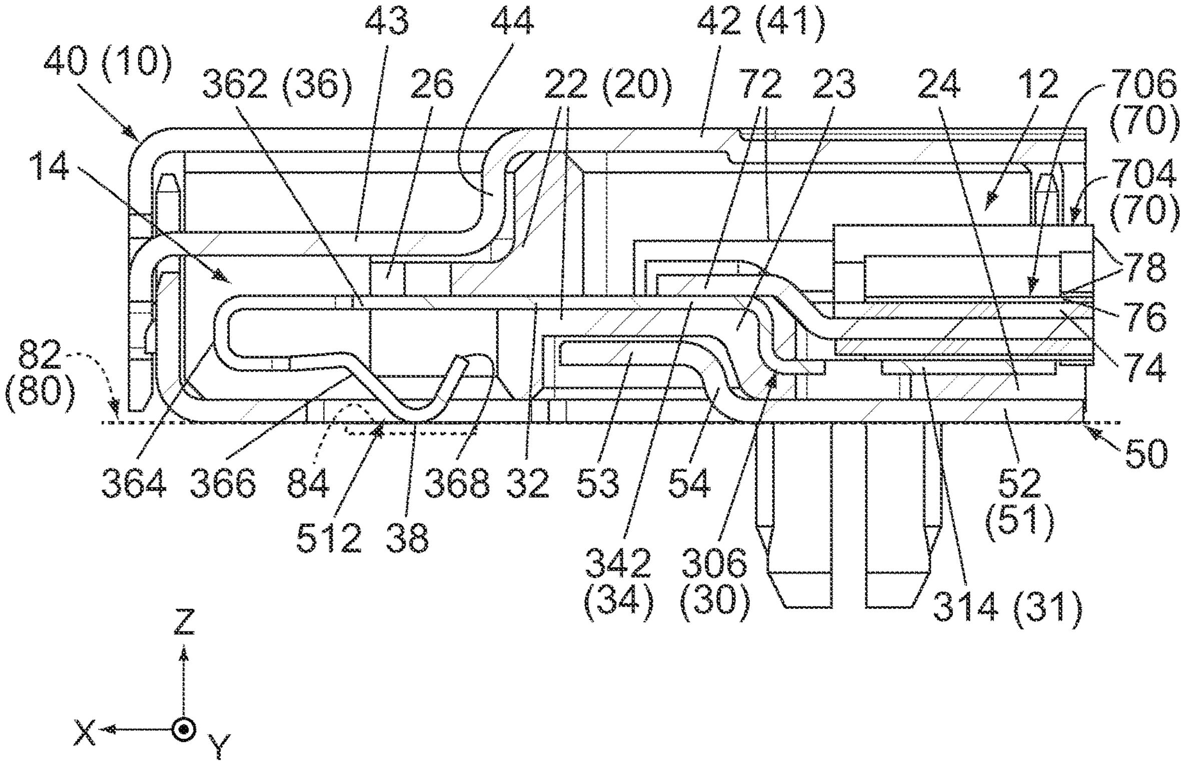
FIG. 8 is another cross-sectional view showing the connector of FIG. 7, wherein the connector is connected to the cables and is fixed on the circuit board, and a part of the circuit board is illustrated with dashed line.

Referring to FIG. 1 together with FIG. 8, each of the discrete cables 702 and 704 of the present embodiment has a core wire 72 made of conductor and a sheath 78 made of insulator. The sheath 78 covers the core wire 72. The core wire 72 is exposed from the sheath 78 at a front end of the cable 70. Each of the predetermined cables 706 has an inner insulator 74 made of insulator and a ground conductor 76 made of conductor in addition to the core wire 72 and the sheath 78. The inner insulator 74 covers the core wire 72. The ground conductor 76 covers the inner insulator 74. The sheath 78 covers the ground conductor 76. The core wire 72 of the predetermined cable 706 is exposed from the inner insulator 74 at a front end of the predetermined cable 706. The ground conductor 76 is exposed from the sheath 78 at a position which is located rearward of the exposed part of the core wire 72.

The cables 70 of the present embodiment include the cables 70 having various sizes and structures as described above. However, the present invention is not limited thereto. For example, all the cables 70 may have the same structures as each other and may have the same sizes as each other. The cables 70 may comprise only one of the predetermined cables 706.

Hereafter, explanation will be made about the second object (circuit board) 80 of the present embodiment.

Figure 2:
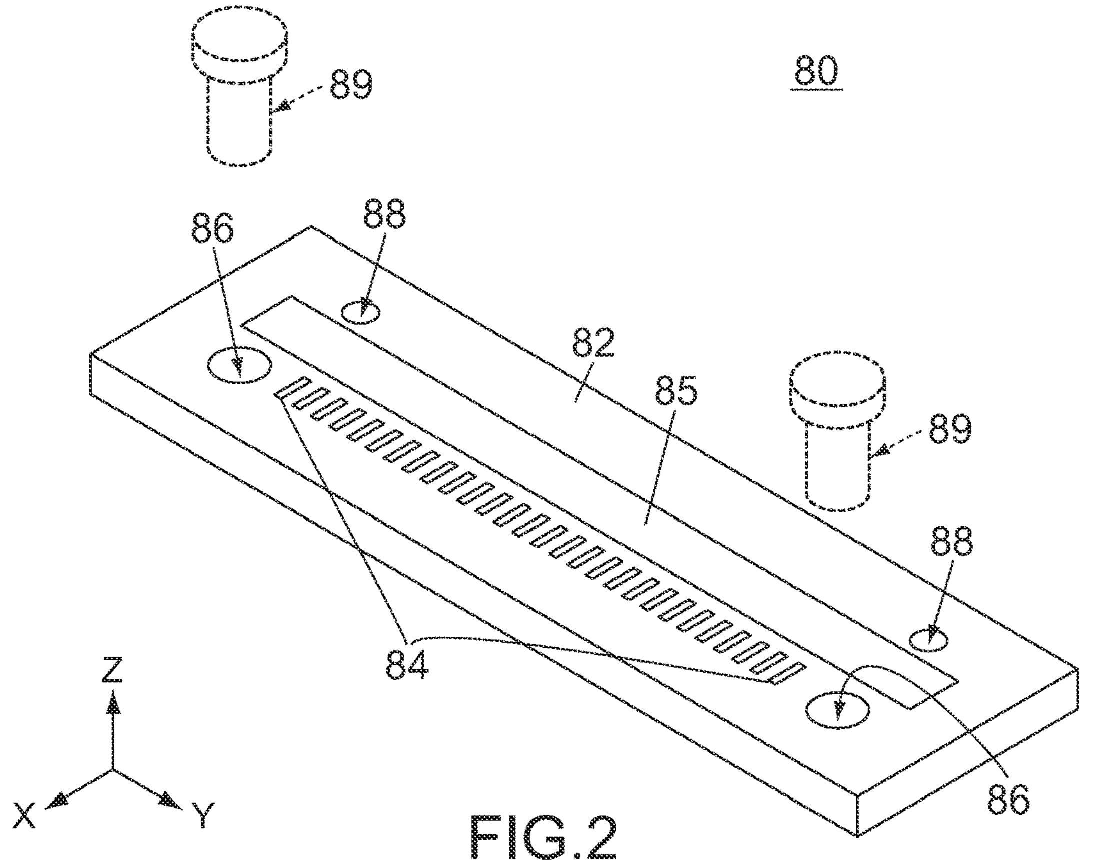
FIG. 2 is a perspective view showing an example of the circuit board of FIG. 1, wherein outlines of the screws before being screwed are illustrated with dashed line.

Referring to FIG. 2, the circuit board 80 of the present embodiment is incorporated in a second electronic device (not shown). The circuit board 80 has an upper surface 82 in an upper-lower direction perpendicular to the front-rear direction. The upper-lower direction of the present embodiment is the Z-direction. In the present embodiment, "upward" means the positive Z-direction, and "downward" means the negative Z-direction. The upper surface 82 extends along a horizontal plane (XY-plane) perpendicular to the upper-lower direction.

The upper surface 82 is formed with twenty eight conductive pads 84 each made of conductor and a ground pattern 85 made of conductor. Each of the conductive pads 84 is a member for electrically connecting the connector 10

(see FIG. 1) with a circuit on the circuit board 80. The ground pattern 85 is a member for grounding the connector 10 on the circuit board 80. The conductive pads 84 are arranged in a pitch direction perpendicular to both the front-rear direction and the upper-lower direction. The pitch direction of the present embodiment is the Y-direction.

The circuit board 80 is formed with two passing holes 86 and two positioning holes 88. The positioning holes 88 are parts for positioning the connector 10 (see FIG. 1) to the second object 80. The passing holes 86 are parts for fixing the connector 10 on the circuit board 80 with screws 89. The two passing holes 86 are located at opposite sides of the conductive pads 84 in the pitch direction, respectively. The two positioning holes 88 are located rearward of the two passing holes 86, respectively.

The circuit board 80 of the present embodiment has the aforementioned structure. In the present embodiment, the fixing mechanism which fixes the connector 10 (see FIG. 1) on the circuit board 80 is the two screws 89. However, the structure of the circuit board 80 is not specifically limited, nor is the fixing mechanism, provided that the connector 10 can be fixed on and electrically connected with the circuit board 80. For example, the fixing mechanism may be a member such as a clamp which vertically sandwiches and presses the connector 10 and the circuit board 80.

Hereafter, explanation will be made about the connector 10 (see FIG. 1) of the present embodiment.

Referring to FIG. 1, the connector 10 is a so-called compression type connector which is pressed against the second object 80 to be connected to the second object 80. When the connector 10 is connected to the second object 80, the first electronic device (not shown) connected to the first object 70 is electrically connected with the second electronic device (not shown) in which the second object 80 is incorporated.

Figure 11:
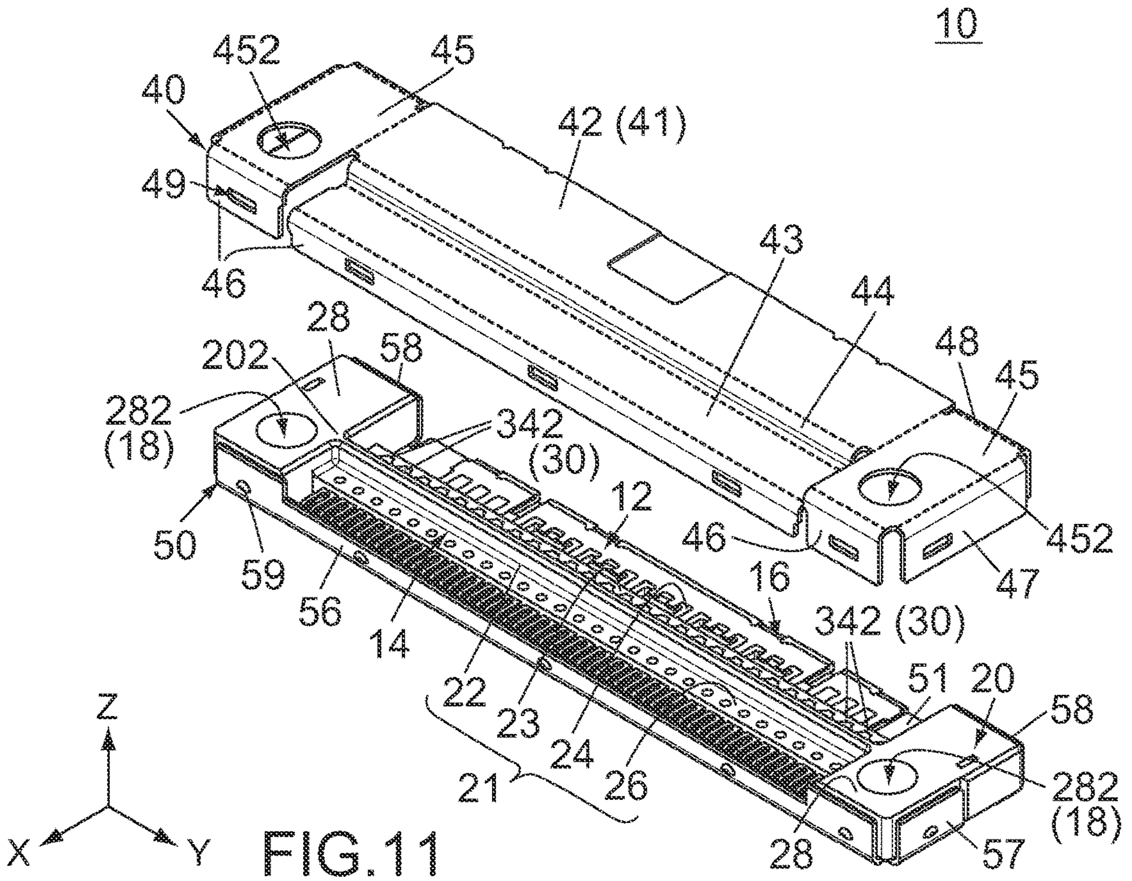
FIG. 11 is an exploded, perspective view showing the connector of FIG. 3, wherein boundaries between portions of a shell are illustrated with dashed line.
Figure 14:
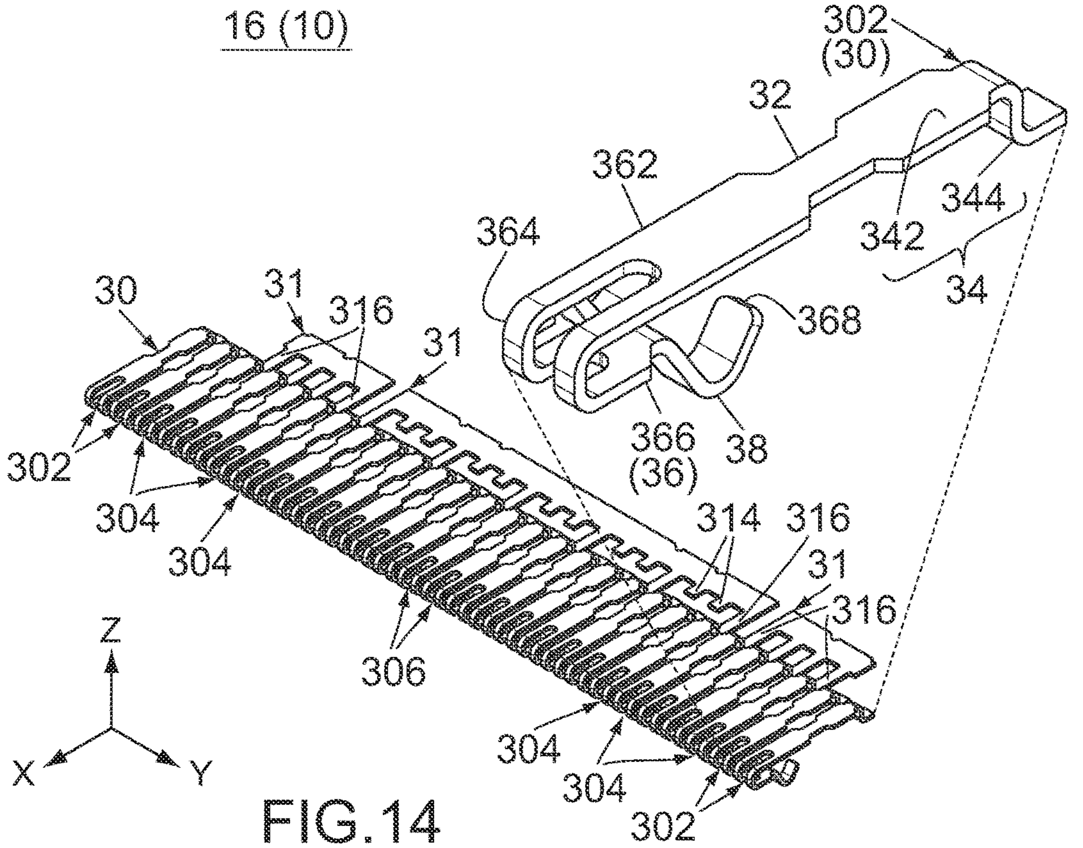
FIG. 14 is a perspective view showing a terminal structure of the connector of FIG. 11, wherein one of terminals of the terminal structure is enlarged and illustrated.

Referring to FIG. 11, the connector 10 of the present embodiment comprises a housing 20 made of insulator, a terminal structure 16 made of metal, a shell 40 made of metal and an additional shell 50 made of metal. Referring to FIG. 14, the terminal structure 16 comprises twenty eight terminals 30 which correspond to the conductive pads 84 (see FIG. 2) of the second object 80 (see FIG. 2), respectively, and three coupling plates 31. Thus, the connector 10 comprises two or more of the terminals 30. Each of the coupling plates 31 couples two or more of the terminals 30 together.

Referring to FIG. 11, all the terminals 30 and all the coupling plates 31 of the terminal structure 16 of the present embodiment are insert-molded in the housing 20. As a result, each of the terminals 30 is fixed in and held by the housing 20. By fixing each of the terminals 30 to the housing 20 as described above, variation of positional relation between the housing 20 and the terminal 30 can be reduced, and thereby transmission characteristics of signals can be improved. The terminals 30 are arranged in the pitch direction. In particular, the terminals 30 of the present embodiment are arranged in a single line along the pitch direction. Referring to FIG. 11 together with FIG. 3, the shell 40 and the additional shell 50 are attached to the housing 20 and sandwiches the housing 20 in the upper-lower direction.

The connector 10 of the present embodiment comprises the aforementioned members. However, the present invention is not limited thereto. For example, referring to FIG. 14, the coupling plates 31 may be provided as necessary. Thus, the terminal structure 16 may comprise only two or more of the terminals 30 which are separated from each other. Referring to FIG. 11, each of the terminals 30 may be press-fit into the housing 20. The additional shell 50 may be insert-molded in the housing 20. The additional shell 50 may be provided as necessary. For example, each of the shell 40 and the additional shell 50 may be a part of a unitary metal plate with bends. The connector 10 may further comprise another member in addition to the aforementioned members.

Hereafter, explanation will be made about the housing 20 of the present embodiment.

The housing 20 of the present embodiment is molded of resin. The housing 20 has a main portion 21 and two side portions 28. The main portion 21 extends along the pitch direction. The side portions 28 are located at opposite sides of the main portion 21 in the pitch direction, respectively. In the present embodiment, each of the main portion 21 and the side portions 28 is a part of the unitary housing 20. However, the present invention is not limited thereto. For example, the housing 20 may be an assembly of a plurality of members which are formed separately from each other.

Figure 5:
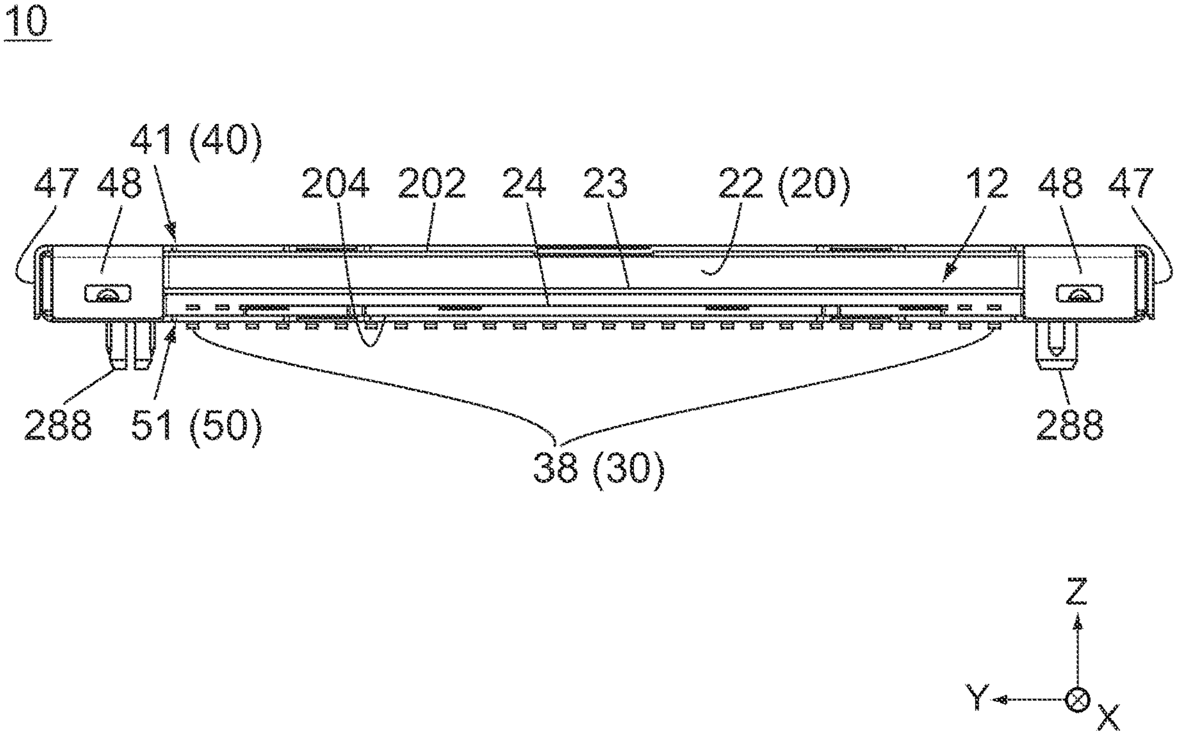
FIG. 5 is a rear view showing the connector of FIG. 3.
Figure 7:
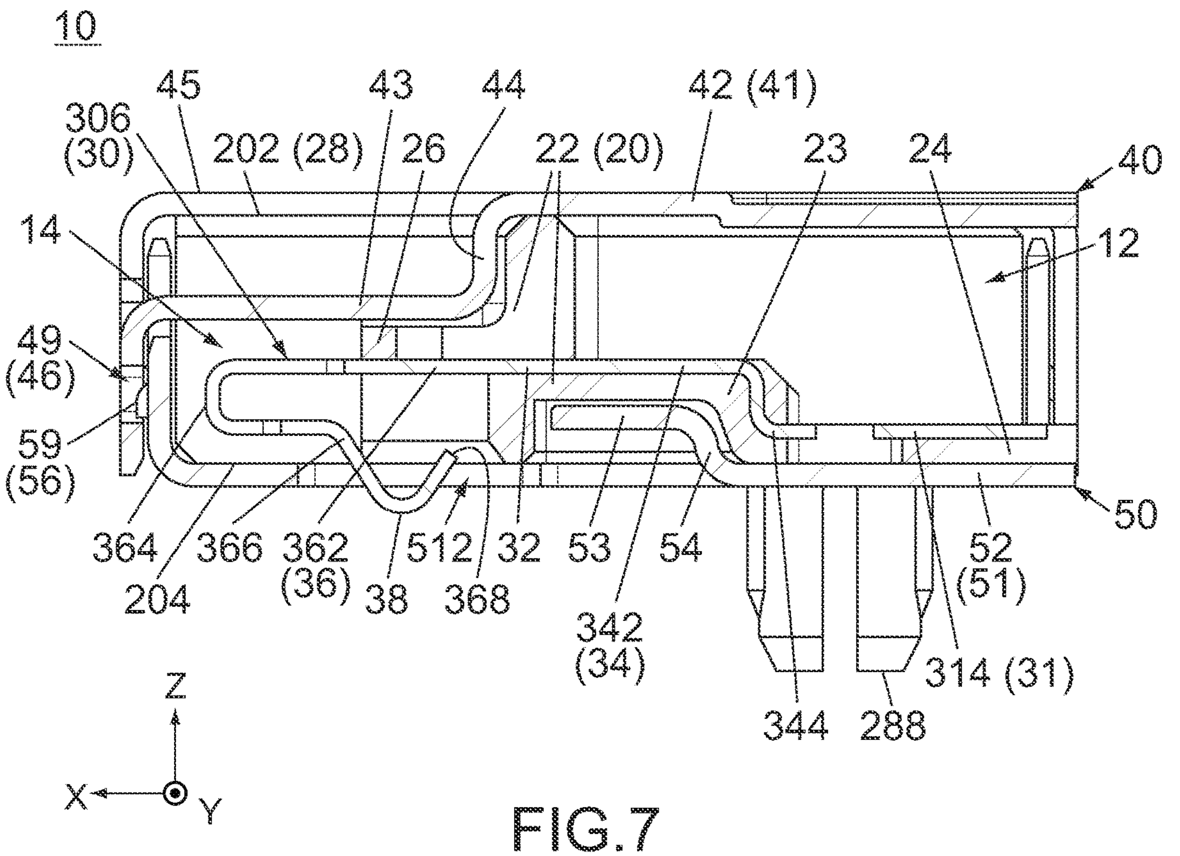
FIG. 7 is a cross-sectional view showing the connector of FIG. 6, taken along line VII-VII.

Referring to FIG. 11 together with FIGS. 5 and 7, the housing 20 is formed with an upper surface 202 and a lower surface 204. The upper surface 202 is located at an upper end of the housing 20. The lower surface 204 is located at a lower end of the housing 20. Each of the upper surface 202 and the lower surface 204 is a flat surface in parallel to the XY-plane.

Figure 4:
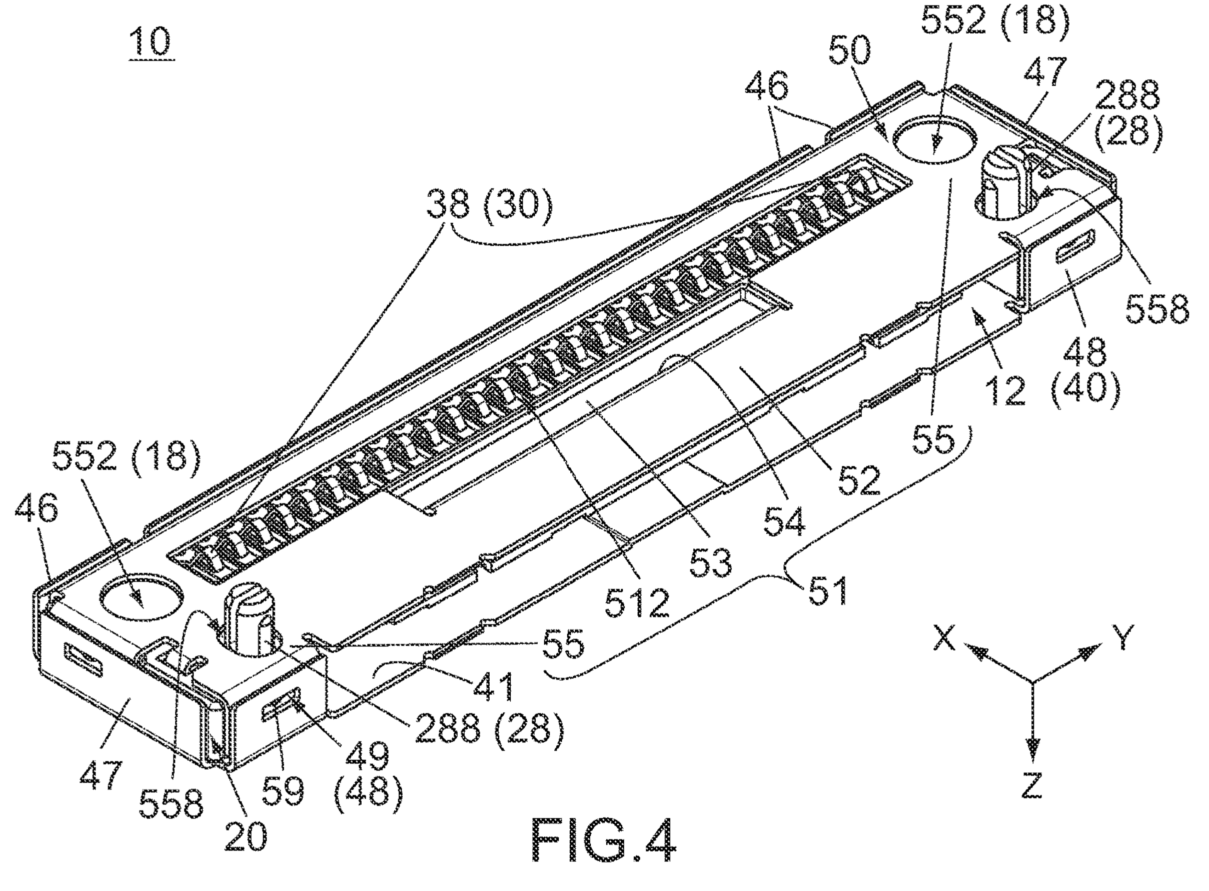
FIG. 4 is another perspective view showing the connector of FIG. 1.

Referring to FIG. 11 together with FIG. 4, each of the side portions 28 is formed with a passing hole 282 and a positioning portion 288. Each of the passing holes 282 passes through the side portion 28 along the upper-lower direction. Each of the positioning portions 288 projects downward from the lower surface 204 (see FIG. 7) of the side portion 28.

As shown in FIG. 11, the main portion 21 includes a holding portion 22, a base portion 23, a plate-like portion 24 and an interposed portion 26. Thus, the housing 20 of the present embodiment has the holding portion 22, the base portion 23, the plate-like portion 24 and the interposed portion 26. Each of the holding portion 22, the base portion 23, the plate-like portion 24 and the interposed portion 26 extends along the pitch direction and is connected to the two side portions 28. Each of the holding portion 22, the base portion 23, the plate-like portion 24 and the interposed portion 26 has an upper end which is a flat surface in parallel to the XY-plane.

Referring to FIG. 11 together with FIG. 7, the holding portion 22 is located at the middle of the housing 20 in the front-rear direction and extends from the upper surface 202 to the lower surface 204 in the upper-lower direction. The thus-formed holding portion 22 has the upper surface 202 which is located at the upper end thereof and the lower surface 204 which is located at a lower end thereof. The interposed portion 26 extends forward from the holding portion 22. In other words, the interposed portion 26 is located forward of the holding portion 22. The upper end of the interposed portion 26 is located below the upper end of the holding portion 22. The base portion 23 extends rearward from the holding portion 22 and is located rearward of the holding portion 22. The upper end of the base portion 23 is located below the upper end of the holding portion 22. The plate-like portion 24 is located rearward of the base portion 23. The upper end of the plate-like portion 24 is located below the upper end of the base portion 23.

The housing 20 of the present embodiment has the aforementioned structure. However, the present invention is not limited thereto. The structure of the housing 20 can be modified as necessary, provided that the housing 20 has the holding portion 22.

Hereafter, explanation will be made about the shell 40 and the additional shell 50 of the present embodiment.

Referring to FIGS. 4 and 11, the additional shell 50 of the present embodiment is a single metal plate with bends. The additional shell 50 is attached to the housing 20 from below. Referring to FIG. 7, the additional shell 50 attached as described above covers, at least in part, the lower surface 204 of the housing 20.

Figure 13:
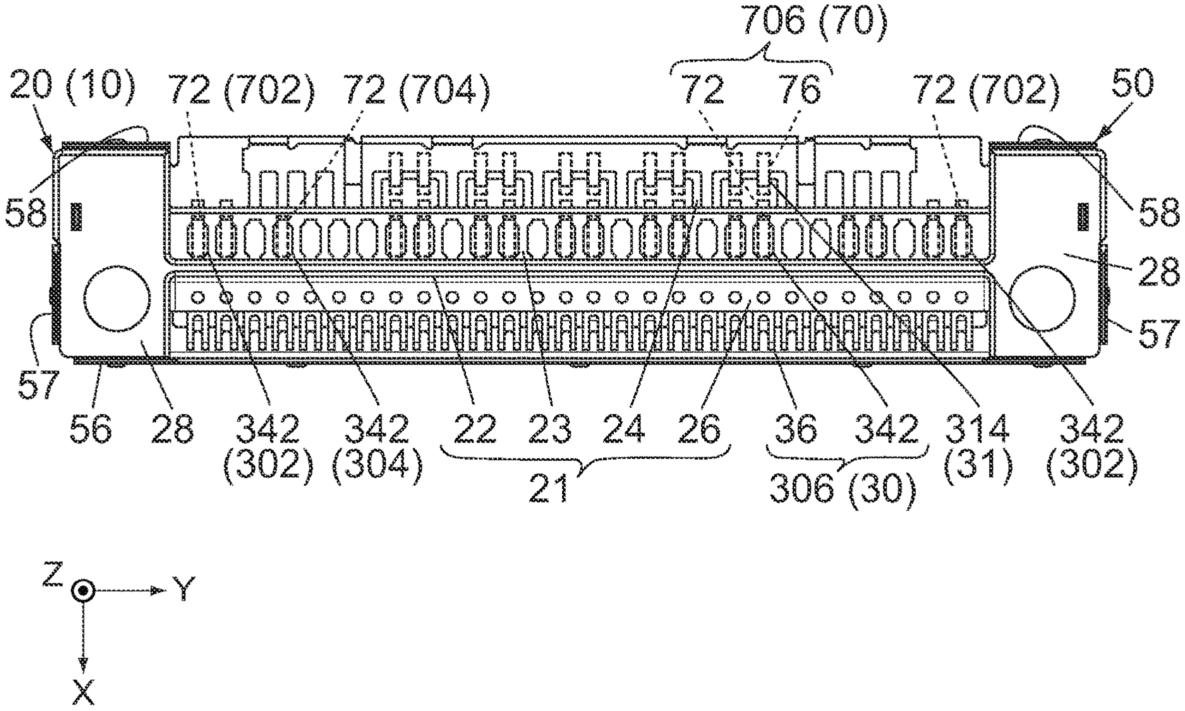
FIG. 13 is a top view showing members of the connector of FIG. 11 except for the shell, wherein parts of the cables are illustrated with dashed line.

As shown in FIGS. 4, 11 and 13, the additional shell 50 has a lower plate 51, a front plate 56, two side plates 57 and two rear plates 58. The lower plate 51, the front plate 56, the side plates 57 and the rear plates 58 are connected to each other. The lower plate 51 covers the housing 20 from below. The front plate 56 covers the housing 20 from front. The two side plates 57 cover opposite sides of the housing 20 in the pitch direction, respectively. The two rear plates 58 cover the housing 20 from behind.

As shown in FIG. 4, the lower plate 51 of the present embodiment has a first lower plate 52, a second lower plate 53, an additional coupling portion 54 and two side portions 55. Thus, the additional shell 50 has the first lower plate 52, the second lower plate 53, the additional coupling portion 54 and the two side portions 55. The first lower plate 52 is located at the middle of the lower plate 51 in the pitch direction. The second lower plate 53 and the additional coupling portion 54 are located at the middle of the first lower plate 52 in the pitch direction and are located at the middle of the first lower plate 52 in the front-rear direction. The lower plate 51 of the present embodiment is formed with a lower hole 512. The lower hole 512 is located forward of the second lower plate 53 and extends between the two side portions 55 along the pitch direction.

The two side portions 55 are located at opposite sides of the first lower plate 52 in the pitch direction, respectively. Each of the first lower plate 52, the second lower plate 53 and the side portions 55 extends in parallel to the XY-plane. Each of the side portions 55 is formed with a passing hole 552 and a passing hole 558. Each of the passing holes 552 and 558 passes through the side portion 55 in the upper-lower direction.

Referring to FIG. 11, each of the lower plate 51, the front plate 56, the side plates 57 and the rear plates 58 of the present embodiment is a part of the unitary additional shell 50. However, the present invention is not limited thereto. For example, the additional shell 50 may be formed of a plurality of metal plates which are joined together. The aforementioned portions may be provided as necessary. The additional shell 50 may further comprise another portion in addition to the aforementioned portions.

The shell 40 of the present embodiment is a single metal plate with bends. The shell 40 is attached to the housing 20 and the additional shell 50 from above. Referring to FIG. 7, the shell 40 attached as described above covers, at least in part, the upper surface 202 of the housing 20.

Figure 3:
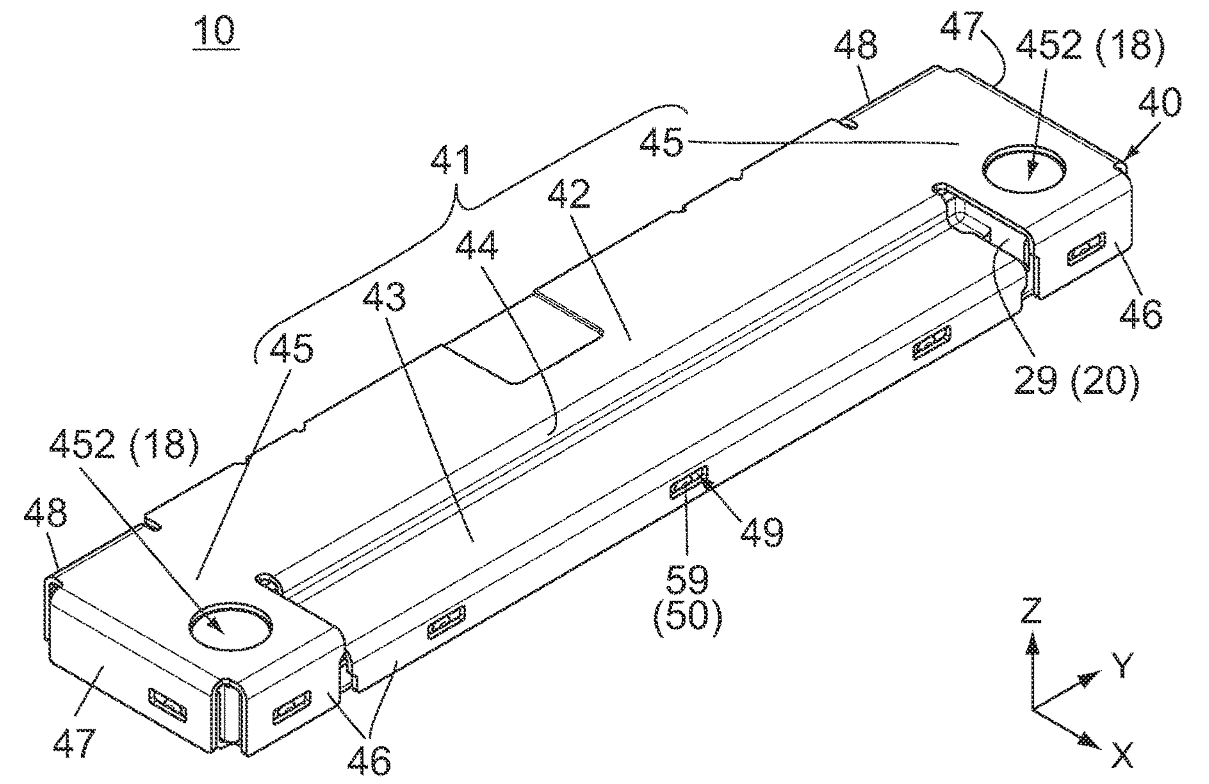
FIG. 3 is a perspective view showing the connector of FIG. 1.
Figure 12:
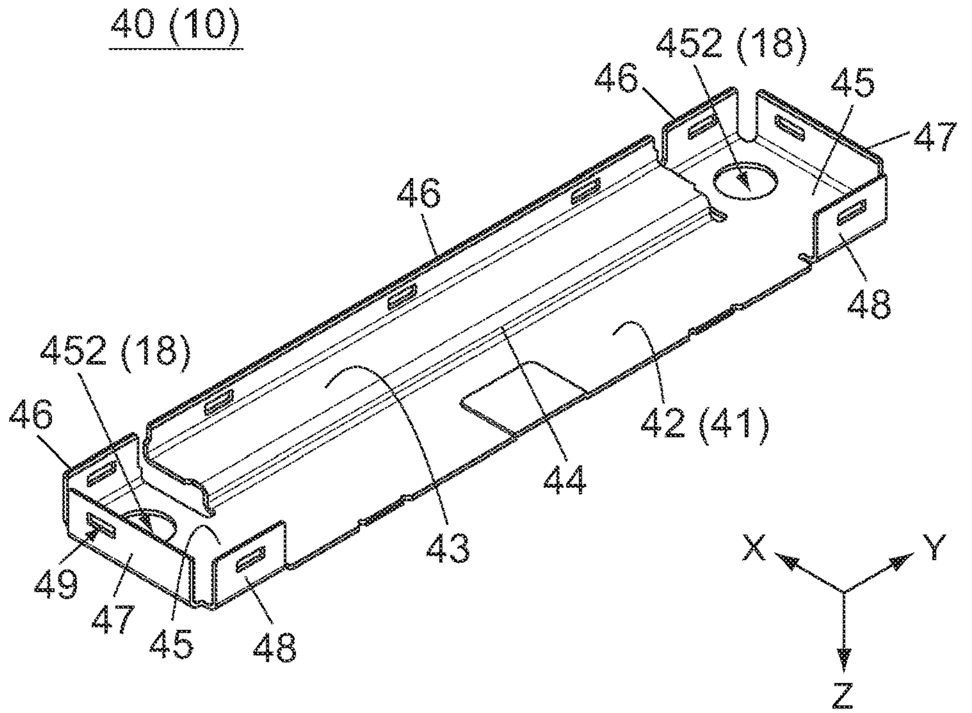
FIG. 12 is a perspective view showing the shell of FIG. 11.

As shown in FIGS. 3, 11 and 12, the shell 40 has an upper plate 41, three front plates 46, two side plates 47 and two rear plate 48. The upper plate 41, the front plates 46, the side plates 47 and the rear plates 48 are connected to each other. The upper plate 41 covers the housing 20 from above. The front plates 46 cover the housing 20 and the front plate 56 of the additional shell 50 from front. The two side plates 47 cover opposite sides of the housing 20 and the two side plates 57 of the additional shell 50 in the pitch direction, respectively. The two rear plates 48 cover the housing 20 and the rear plates 58 of the additional shell 50 from behind.

As shown in FIG. 3, the upper plate 41 of the present embodiment has a first upper plate 42, a second upper plate 43, a coupling portion 44 and two side portions 45. Thus, the shell 40 has the first upper plate 42, the second upper plate 43, the coupling portion 44 and the two side portions 45. The first upper plate 42, the second upper plate 43 and the coupling portion 44 are located at the middle of the upper plate 41 in the pitch direction. The coupling portion 44 is located forward of the first upper plate 42. The second upper plate 43 is located forward of the coupling portion 44 and is connected to one of the front plates 46.

The two side portions 45 are connected to opposite sides of the first upper plate 42 in the pitch direction, respectively, and extend from a position same as that of a rear end of the first upper plate 42 to another position same as that of a front end of the second upper plate 43 in the front-rear direction. Each of the first upper plate 42, the second upper plate 43 and the side portions 45 extends in parallel to the XY-plane. Each of the side portions 45 is formed with a passing hole 452. Each of the passing holes 452 passes through the side portion 45 in the upper-lower direction.

Each of the upper plate 41, the front plates 46, the side plates 47 and the rear plates 48 of the present embodiment is a part of the unitary shell 40. However, the present invention is not limited thereto. For example, the shell 40 may be formed of a plurality of metal plates which are joined together. The aforementioned portions of the shell 40 except the upper plate 41 may be provided as necessary. The shell 40 may further have another portion in addition to the aforementioned portions. Referring to FIG. 1, the composite cable 71 may comprise a ground wire (not shown) having a ground potential in addition to the illustrated cables 70. The ground wire may be connected to the upper plate 41.

Referring to FIG. 11 together with FIGS. 3 and 4, the front plates 46, the side plates 47 and the rear plates 48 of the shell 40 are formed with a plurality of engagement holes 49. The front plate 56, the side plates 57 and the rear plates 58 of the additional shell 50 are formed with a plurality of engagement projections 59 which correspond to the engagement holes 49, respectively. The engagement projections 59 are engaged with the engagement holes 49, respectively, and thereby the shell 40 and the additional shell 50 are securely fixed to each other. The shell 40 and the additional shell 50 are engaged with each other and are electrically connected with each other at all the portions which enclose the housing 20 in the XY-plane.

Figure 9:
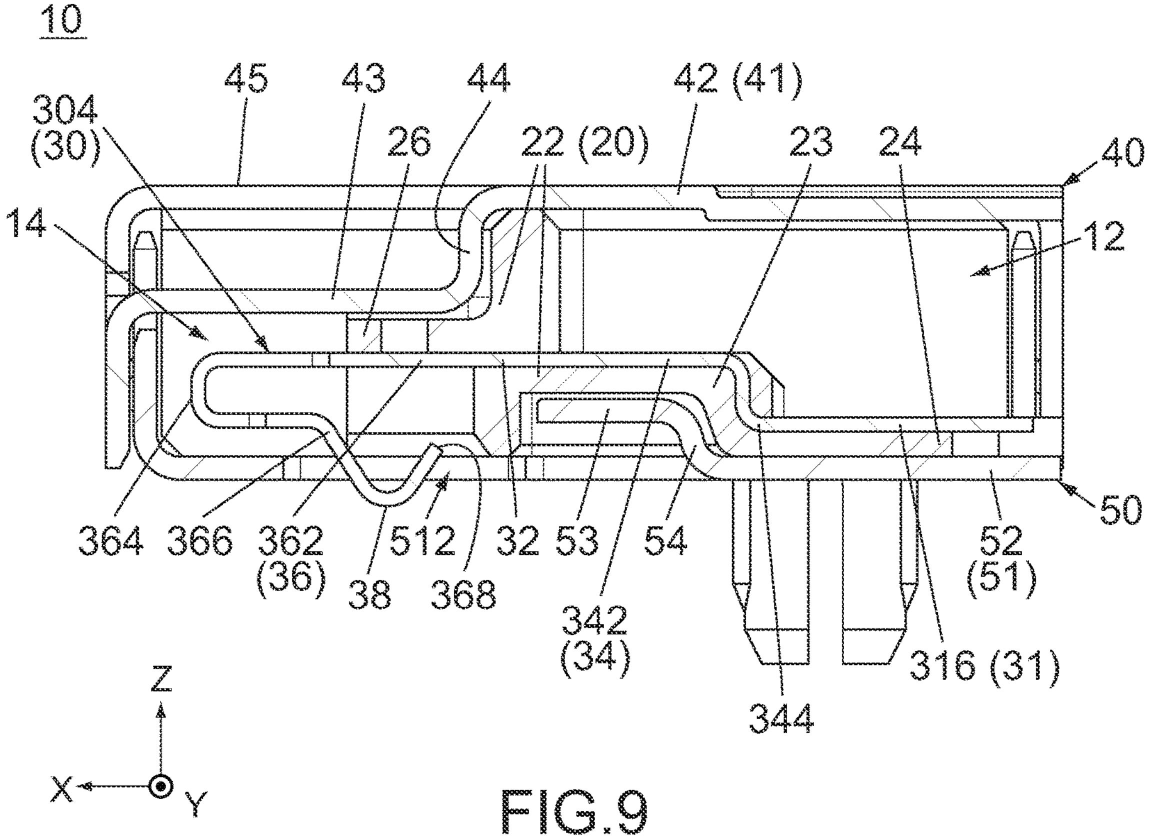
FIG. 9 is a cross-sectional view showing the connector of FIG. 6, taken along line IX-IX.

Referring to FIGS. 4, 5, 7 and 9, the connector 10 of the present embodiment is formed with a receiving portion 12. The receiving portion 12 is a space which is located in a rear part of the connector 10. Referring to FIGS. 7, 9 and 11, the connector 10 of the present embodiment is formed with an accommodating portion 14. The accommodating portion 14 is a space which is located in a front part of the connector 10.

Figure 6:
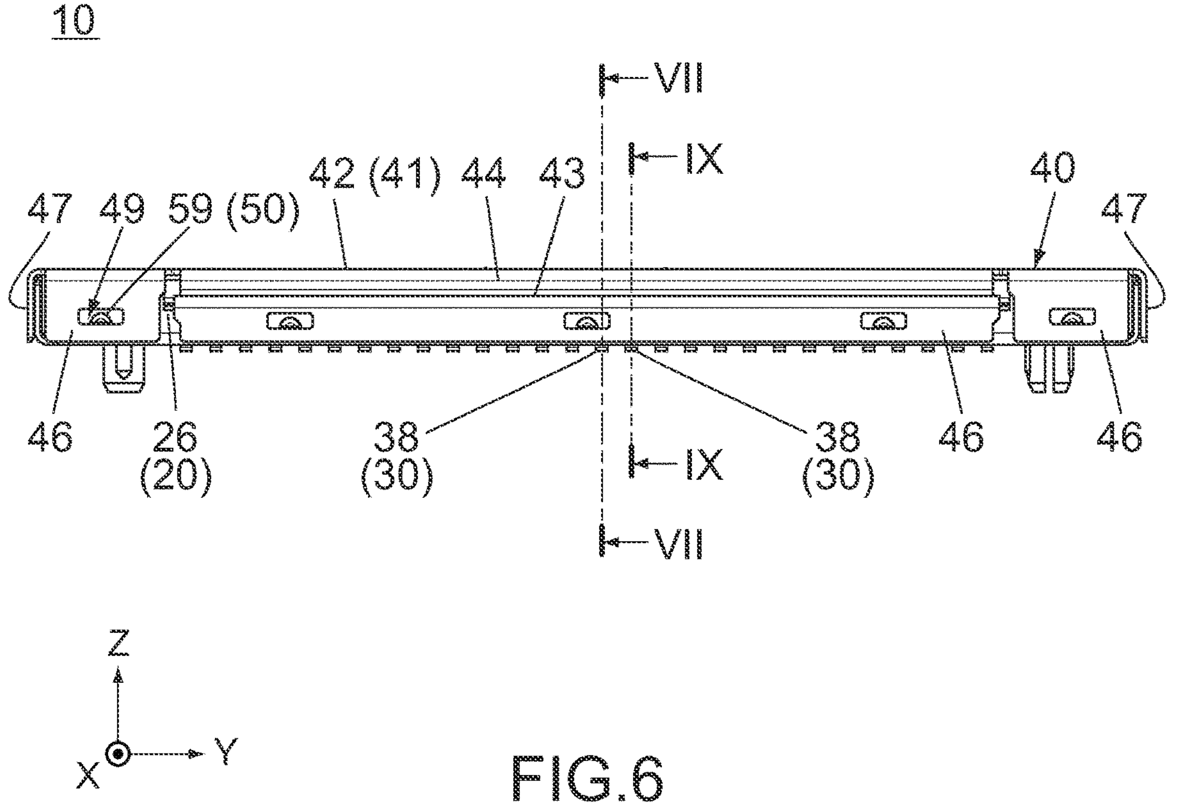
FIG. 6 is a front view showing the connector of FIG. 3.

The receiving portion 12 and the accommodating portion 14 are separated from each other in the front-rear direction by the holding portion 22 of the housing 20. The receiving portion 12 and the accommodating portion 14 are covered from above by the upper plate 41 of the shell 40 and is covered from below by the lower plate 51 of the additional shell 50. Referring to FIGS. 7 and 9 together with FIG. 6, the accommodating portion 14 is covered from front by the shell 40 and the additional shell 50. The receiving portion 12 opens rearward. The accommodating portion 14 opens downward through the lower hole 512 of the additional shell 50.

Referring to FIG. 4 together with FIG. 11, when the connector 10 is assembled as described above, the two positioning portions 288 of the housing 20 project downward through the two passing holes 558, respectively. When the connector 10 is assembled, the two passing holes 452 of the shell 40, the two passing holes 282 of the housing 20 and the two passing holes 552 of the additional shell 50 are arranged in the upper-lower direction, respectively, and form two passing holes 18. Each of the passing holes 18 passes through the connector 10 in the upper-lower direction.

Referring to FIG. 1, the connector 10 of the present embodiment can be fixed on the second object 80 as described below. Referring to FIGS. 1 and 2 together with FIG. 4, first, the positioning portions 288 are inserted into the positioning holes 88, respectively, and thereby the connector 10 is positioned to the second object 80. Then, the connector 10 is pressed against the second object 80 and is temporarily fixed on the second object 80 by the positioning portions 288. Then, the two screws 89 are screwed into nuts (not shown) through the passing holes 552 and the passing holes 86 of the second object 80, respectively. As a result, the connector 10 is securely fixed on the second object 80.

Referring to FIGS. 2 and 4, according to the present embodiment, each of the positioning portions 288 has a cross section in the XY-plane which partially protrudes from another cross section of the positioning hole 88 in the XY-plane. In addition, each of the positioning portions 288 has a branch structure which is resiliently deformable in the XY-plane. The connector 10 is temporarily fixed on the second object 80 as a result of the positioning by the positioning portions 288 and the positioning holes 88. However, the present invention is not limited thereto. For example, the cross section of each of the positioning portions 288 in the XY-plane may be smaller than the cross section of the positioning hole 88 in the XY-plane. The positioning portions 288 may be provided as necessary.

Figure 10:
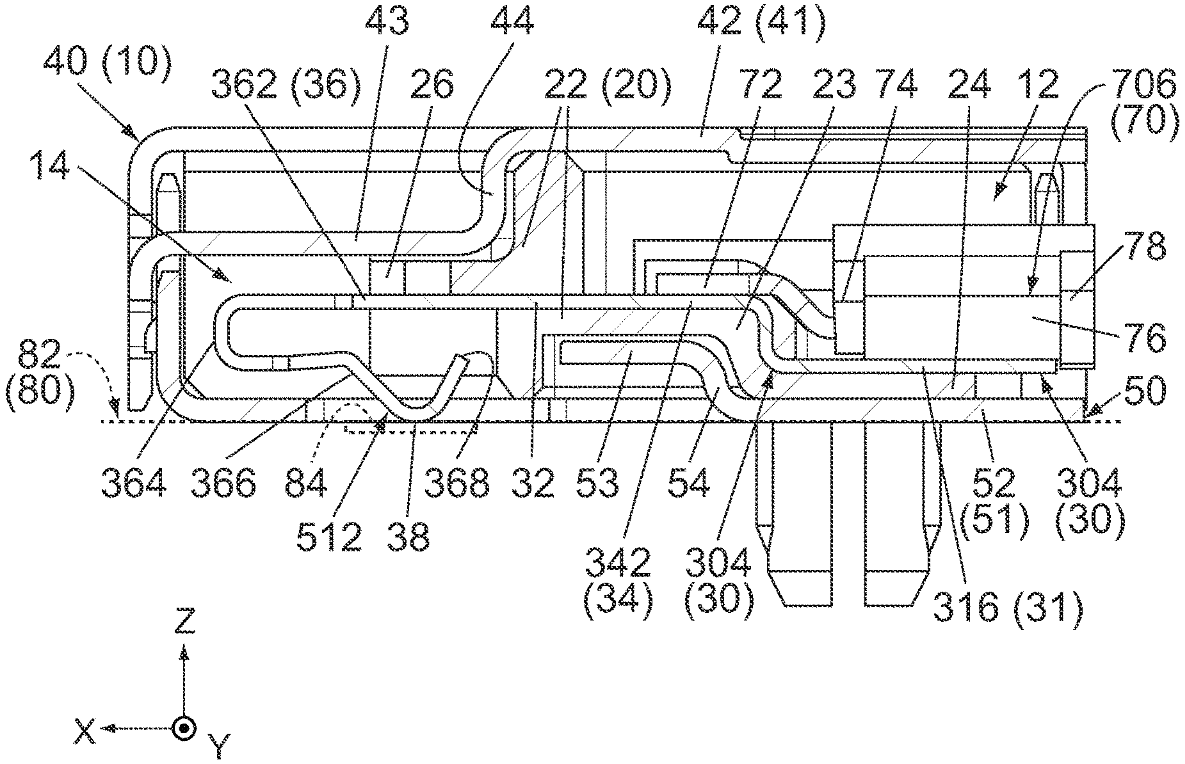
FIG. 10 is another cross-sectional view showing the connector of FIG. 9, wherein the connector is connected to the cables and is fixed on the circuit board, and a part of the circuit board is illustrated with dashed line.

Referring to FIGS. 8 and 10 together with FIG. 2, the flat lower plate 51 of the additional shell 50 is brought into contact with the ground pattern 85 of the second object 80 when the connector 10 is fixed on the second object 80. As a result, the shell 40 and the additional shell 50 are connected to the ground pattern 85 and grounded to have the same ground potential as each other. The terminal structure 16 (see FIG. 11) is vertically covered by the shell 40 and the additional shell 50 and is covered from front. The thus-covered terminal structure 16 is electro-magnetically shielded. According to the aforementioned structure, the connector 10 of the present embodiment can effectively reduce electro-magnetic Interference (EMI). However, the present invention is not limited thereto, but the structure of each of the shell 40 and the additional shell 50 can be modified as necessary.

Figure 15:
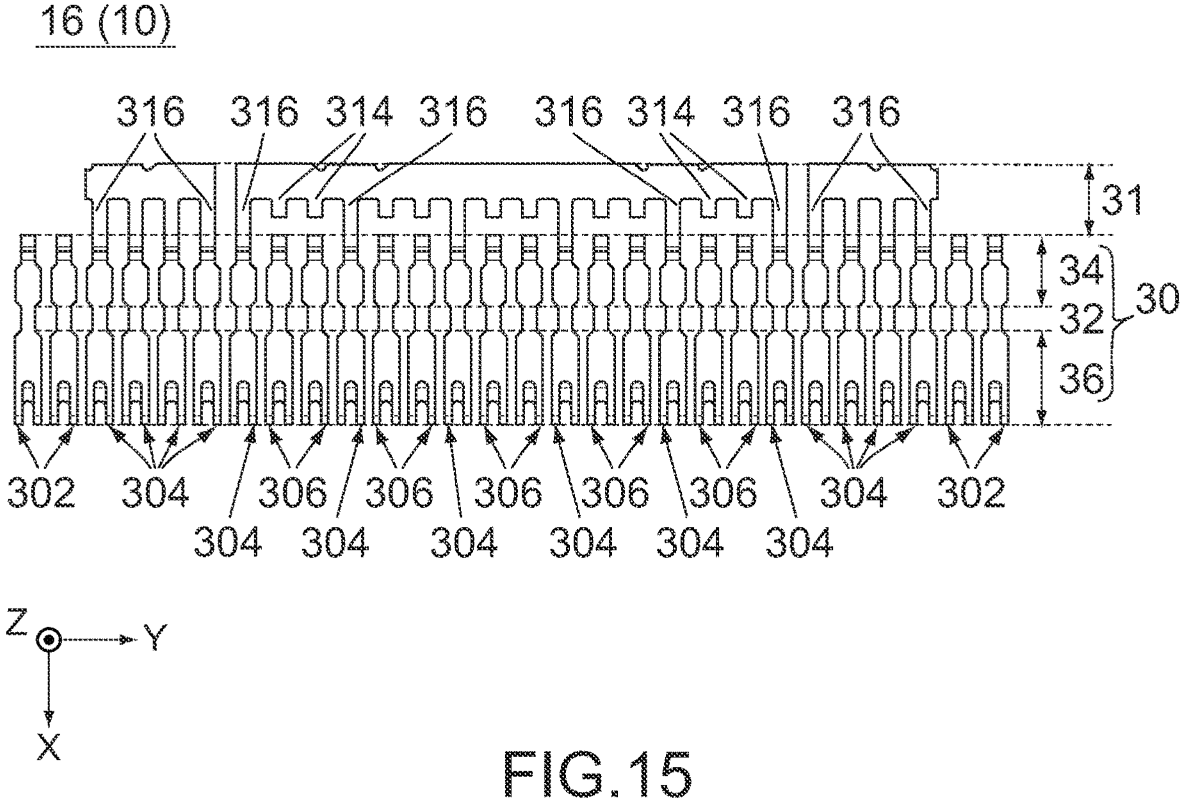
FIG. 15 is a top view showing the terminal structure of FIG. 14, wherein boundaries between portions of the terminals are illustrated with dashed line.

Referring to FIGS. 14 and 15, the terminals 30 of the present embodiment have shapes same as each other. However, the present invention is not limited thereto. For example, the terminals 30 may have shapes different from each other. Hereafter, explanation will be made about one of the terminals 30. The explanation described below is applicable to each of the terminals 30.

The terminal 30 of the present embodiment is a single metal plate with bends. The terminal 30 has a held portion 32, a first portion 34 and a second portion 36. The terminal 30 of the present embodiment has only the held portion 32, the first portion 34 and the second portion 36. In the present embodiment, each of the held portion 32, the first portion 34 and the second portion 36 is a part of the unitary terminal 30. However, the present invention is not limited thereto. For example, the terminal 30 may be formed of a plurality of metal plates which are joined together. The terminal 30 may further have another portion in addition to the aforementioned portions.

Referring to FIGS. 14 and 15 together with FIG. 7, the held portion 32 of the present embodiment extends straight along the front-rear direction and is held by the holding portion 22 of the housing 20. The held portion 32 is buried in the holding portion 22. In detail, the held portion 32 is enclosed by the thick holding portion 22 with no gap in a vertical plane (YZ-plane). The first portion 34 extends rearward from the held portion 32. The first portion 34 is embedded in the housing 20 except for an upper surface and a rear end thereof. The second portion 36 extends forward from the held portion 32. The second portion 36 is located in the accommodating portion 14 for the most part but is partially embedded in the housing 20.

The first portion 34 of the present embodiment has a connectable portion 342 and a buried portion 344. The connectable portion 342 extends straight rearward from a rear end of the held portion 32 along an upper surface of the base portion 23 of the housing 20. The connectable portion 342 is embedded in the base portion 23 except for an upper surface thereof. The upper surface of the connectable portion 342 is a flat surface in parallel to the XY-plane. The upper surface of the connectable portion 342 is exposed upward from the base portion 23 and faces the receiving portion 12. The buried portion 344 extends rearward from a rear end of the connectable portion 342 while curving. The buried portion 344 is buried in the base portion 23 except for a rear end thereof. The rear end of the buried portion 344 projects rearward from the base portion 23. Referring to FIG. 8, the connectable portion 342 is configured to be connected to the first object 70. In detail, the core wire 72 of the first object 70 is fixed on and connected to the upper surface of the connectable portion 342 via soldering.

Referring to FIGS. 14 and 15 together with FIG. 7, the second portion 36 of the present embodiment has an extending portion 362, a bent portion 364, a support portion 366, a contact portion 38 and an end 368. The second portion 36 is exposed from the housing 20 except for a part of an upper surface of the extending portion 362. The second portion 36 has a middle part in the pitch direction which is partially cut out.

The extending portion 362 extends forward from the held portion 32. In detail, the extending portion 362 extends straight forward from a front end of the held portion 32 along a lower surface of the interposed portion 26 of the housing 20. The bent portion 364 is connected to a front end of the extending portion 362 and is bent back. The support portion 366 extends rearward from the bent portion 364. In detail, the support portion 366 extends straight rearward from a rear end of the bent portion 364 and then extends rearward and downward. Thereafter, the support portion 366 extends rearward and upward. The contact portion 38 is provided on the support portion 366. The end 368 is a rear end of the support portion 366.

Referring to FIGS. 7 and 9, the support portion 366 which is formed as describe above is resiliently deformable and has the end 368 which is a free end. The contact portion 38 is supported by the support portion 366 and is movable in the upper-lower direction in accordance with a resilient deformation of the support portion 366. The contact portion 38 of the present embodiment faces downward. In detail, the contact portion 38 is located at a lower end of the support portion 366 and protrudes downward. When the connector 10 is separated from the second object 80 (see FIGS. 8 and 10), the second portion 36 of the terminal 30 is accommodated in the accommodating portion 14 except for the contact portion 38 and a part located in the vicinity of the contact portion 38, and the contact portion 38 projects downward through the lower hole 512 of the additional shell 50.

Referring to FIGS. 8 and 10, the contact portion 38 is pressed against the second object 80 when the connector 10 is fixed on the second object 80. In detail, the contact portion 38 is pressed against the corresponding conductive pad 84 of the second object 80 while the support portion 366 is resiliently deformed, and thereby the connector 10 is electrically connected with the second object 80. According to the present embodiment, the contact portion 38 is electrically connected with the conductive pad 84 not by using a fixing method such as soldering but by merely pressing the contact portion 38. Therefore, the connector 10 can be detached from the second object 80 by merely unscrewing the screws 89 (see FIG. 1).

The support portion 366 of the present embodiment is a cantilever and is easily deformed resiliently. According to the structure of the second portion 36 of the present embodiment, a spring length of the second portion 36 including the support portion 366 can be made long, and a movement distance of the contact portion 38 in the upper-lower direction can be made long. Even when the contact portion 38 is largely moved, the end 368 is moved in the accommodating portion 14 without being brought into abutment with the other portion and the other member.

However, the present invention is not limited thereto. For example, the connector 10 may be connected to the second object 80 along the front-rear direction. More specifically, the second object 80 may extend along the YZ-plane. The connector 10 may open forward. The contact portion 38 may be located at a front end of the support portion 366. The contact portion 38 may project forward through an opening of the connector 10 when the connector 10 is separated from the second object 80.

Each of the terminals 30 of the present embodiment has the aforementioned structure. However, the present invention is not limited thereto, but the structure of each of the terminals 30 can be modified as necessary. For example, the buried portion 344, the extending portion 362, the bent portion 364 and the end 368 may be provided as necessary. In an instance where the extending portions 362 and the bent portions 364 are not provided, each of the support portions 366 may extend forward and downward from the front end of the held portion 32.

Referring to FIGS. 14 and 15, the terminals 30 of the present embodiment include four separated terminals 302, fourteen coupled terminals 304 and ten predetermined terminals 306.

Each of the separated terminals 302 is not provided with any part of the coupling plate 31 which is located rearward thereof. More specifically, no part of the coupling plate 31 is located just behind the separated terminal 302. Each of the coupled terminals 304 is provided with a coupling portion 316 which is a part of the coupling plate 31. Each of the coupling portions 316 is connected to the rear end of the first portion 34 of the coupled terminal 304 and couples the coupled terminal 304 and the coupling plate 31 together along the front-rear direction. Each of the predetermined terminals 306 is provided with a mount portion 314 which is a part of the coupling plate 31. Each of the mount portions 314 is apart from and is located rearward of the first portion 34 of the predetermined terminal 306. The first portion 34 of each of the predetermined terminals 306 is located at the same position as that of the mount portion 314, which is located rearward of the first portion 34, in the pitch direction.

Each of the mount portions 314 of the present embodiment is located below the connectable portion 342 of the predetermined terminal 306. However, the present invention is not limited thereto. For example, each of the mount portions 314 may be located at the same position as that of the connectable portion 342 of the predetermined terminal 306 in the upper-lower direction.

Referring to FIGS. 8 and 10, front ends of all the cables 70 are received in the receiving portion 12 and are connected to the terminals 30, respectively, as described below.

Referring to FIG. 13, each of the discrete cables 702 is connected to the separated terminal 302. Thus, the terminals 30 include one or more of the separated terminals 302 configured to be connected to the discrete cables 702, respectively. The core wire 72 of each of the discrete cables 702 is fixed on and connected to the connectable portion 342 of the separated terminal 302 via soldering. This structure enables low frequency signals to be transmitted to the separated terminal 302 through each of the discrete cables 702.

Each of the discrete cables 704 is connected to the coupled terminal 304. Thus, the terminals 30 include one or more of the coupled terminals 304 configured to be connected to the discrete cables 704, respectively. The core wire 72 of each of the discrete cables 704 is fixed on and connected to the connectable portion 342 of the coupled terminal 304 via soldering. This structure enables power voltage to be supplied to four of the coupled terminals 304 through one or two of the discrete cables 704.

Each of the predetermined cables 706 is connected to the predetermined terminal 306. Thus, the terminals 30 include one or more of the predetermined terminals 306 which correspond to the predetermined cables 706, respectively. The core wire 72 of each of the predetermined cables 706 is fixed on and connected to the connectable portion 342 of the corresponding predetermined terminal 306 via soldering. Each of the ground conductors 76 is mounted on the mount portion 314 which is located just behind the corresponding predetermined terminal 306 and is fixed on and connected to the mount portion 314 via soldering. Thus, each of the ground conductors 76 is configured to be mounted on and connected to the mount portion 314 which is located rearward of the corresponding predetermined terminal 306.

According to the present embodiment, two of the coupled terminals 304 which are coupled to the common coupling plate 31 are located at opposite sides of two of the predetermined terminals 306 in the pitch direction, respectively. This structure enables high frequency signals to be transmitted to two of the predetermined terminals 306 through two of the predetermined cables 706 and enables two of the coupled terminals 304 each having a ground potential to be arranged at opposite sides of two of the predetermined terminals 306 in the pitch direction. As a result, transmission characteristics of high frequency signals can be improved. In addition, a front part of the predetermined cable 706 can extend straight along the front-rear direction because the mount portion 314 is located below the connectable portion 342.

The terminals 30 of the present embodiment are arranged as described above and are connected to the first object 70 as described above. However, the present invention is not limited thereto. For example, two of the coupled terminals 304 may be located at opposite sides of one of the predetermined terminals 306 in the pitch direction, respectively.

Each of the discrete cables 704 may be connected to the coupling portion 316 which is located rearward of the coupled terminal 304.

Hereafter, further specific explanation will be made about the upper plate 41 (see FIG. 3) of the shell 40 of the present embodiment.

Referring to FIGS. 1 and 3, the coupling portion 44 and the second upper plate 43 are formed by bending a metal piece which is formed by partially cutting the upper plate 41. The thus-formed second upper plate 43 is coupled to the first upper plate 42 via the coupling portion 44. The coupling portion 44 of the present embodiment couples the whole front end of the first upper plate 42 and the whole rear end of the second upper plate 43 together. The coupling portion 44 is separated from the shell 40 except for the first upper plate 42 and the second upper plate 43. The second upper plate 43 is separated from the shell 40 except for the coupling portion 44 and the front plates 46. The opposite edges of the coupling portion 44 and the second upper plate 43 in the pitch direction are not connected to any parts of the shell 40.

Referring to FIG. 11 together with FIG. 7, the first upper plate 42 extends over two or more of the terminals 30 along the pitch direction and covers the first portions 34 of the terminals 30 from above in the upper-lower direction. The first upper plate 42 of the present embodiment covers all the first portions 34 from above. The second upper plate 43 extends over two or more of the terminals 30 along the pitch direction and covers the second portions 36 of the terminals 30 from above. The second upper plate 43 of the present embodiment covers all the second portions 36 from above. The second upper plate 43 is located below the first upper plate 42.

Referring to FIG. 8, the first upper plate 42 of the shell 40 having the ground potential covers the receiving portion 12, in which the first portions 34 of the terminals 30 are arranged, from above. The first object 70 is connected to the connectable portions 342 of the first portions 34 in the receiving portion 12. In general, the receiving portion 12 needs to be large enough so that the first object 70 can be received therein. More specifically, a distance between the first upper plate 42 and each of the connectable portions 342 needs to be long to some extent. In particular, in an instance where the first object 70 is the cables 70, the first upper plate 42 needs to be apart from the connectable portions 342 to some extent so that short circuit between the core wires 72 of the first object 70 and the shell 40 can be prevented. According to an existing technique, the upper plate 41 of the shell 40 is formed so that the whole upper plate 41 is located above and apart from the terminals 30.

The held portion 32 of each of the terminals 30 is covered by insulator. According to this structure, impedance of the held portion 32 can be made relatively low even when the upper plate 41 having the ground potential is apart from the terminals 30. The first portion 34 of each of the terminals 30 is partially exposed in the receiving portion 12. However, impedance of the first portion 34 can be made relatively low because the ground conductors 76 of the cables 70 are located near the first portion 34. On the other hand, the second portion 36 of each of the terminals 30 is exposed in the accommodating portion 14 for the most part and thereby tends to have high impedance. According to the existing technique, transmission characteristics tend to be degraded because the impedance of the second portion 36 does not match with the impedance of the held portion 32 and the impedance of the first portion 34.

However, according to the present embodiment, the second upper plate 43 of the shell 40 is located below the first upper plate 42 and covers the second portions 36 of the terminals 30, which are provided with the contact portions 38, from above. In other words, the second upper plate 43 is provided so that it is close to the second portions 36. According to this structure, the impedance of the first portion 34, the impedance of the second portion 36 and the impedance of the held portion 32 are matched with each other, and thereby transmission characteristics can be improved. As described above, the present embodiment provides the compression type connector 10 which can be improved in transmission characteristics.

According to the present embodiment, the coupling portion 44 and the second upper plate 43 are formed by cutting and bending a part of the shell 40. According to this forming method, the second upper plate 43 can be largely apart from the first upper plate 42 in the upper-lower direction and can be made nearer to the second portion 36. Moreover, the second upper plate 43 of the present embodiment has a flat-plate shape with no irregularities and extends along the XY-plane. However, the present invention is not limited thereto. For example, in an instance where the second portions 36 are arranged at different positions from each other in the upper-lower direction or in the front-rear direction, the second upper plate 43 may be adjusted in its position in the upper-lower direction or in the front-rear direction in accordance with the arrangement of the second portions 36. For example, the second upper plate 43 may be formed with two or more parts which are located at different positions from each other in the upper-lower direction.

According to the present embodiment, the first upper plate 42, the coupling portion 44 and the second upper plate 43 each extending along the pitch direction are seamlessly connected to each other in the front-rear direction. According to this structure, transmission characteristics can be easily improved. However, the present invention is not limited thereto. For example, two or more of the coupling portions 44 and two or more of the second upper plates 43 may be formed at necessary positions in accordance with the arrangement of the second portions 36.

Referring to FIGS. 1 and 3, according to the forming method of the coupling portion 44 and the second upper plate 43 of the present embodiment, the housing 20 is partially exposed outward. Thus, the housing 20 of the present embodiment has one or more visible portions 29 each of which is exposed outward. Each of the visible portions 29 is adjacent to the coupling portion 44. Each of the visible portions 29 is located at a position which is, at least in part, same as that of the coupling portion 44 in the upper-lower direction and is visible from outside the connector 10.

According to the present embodiment, the coupling portion 44 is located between the first upper plate 42 and the second upper plate 43 in the front-rear direction and extends along the pitch direction. According to this structure, the one or more visible portions 29 of the present embodiment include two visible portions 29. The two visible portions 29 are located at opposite sides of the coupling portion 44 in the pitch direction, respectively.

Referring to FIGS. 7 and 9, according to the present embodiment, the interposed portion 26 of the housing 20 partially covers the second portion 36 of each of the terminals 30. The interposed portion 26 is interposed between the second upper plate 43 and the second portions 36. A distance between the second upper plate 43 and each of the second portions 36 can be easily maintained at a constant level by providing the interposed portion 26. Thus, according to the present embodiment, the distance between the second upper plate 43 and each of the second portions 36 can be easily made small while short circuit between the second upper plate 43 and the second portions 36 is prevented. However, the present invention is not limited thereto, but the interposed portion 26 may be provided as necessary.

Hereafter, further specific explanation will be made about the lower plate 51 of the additional shell 50 of the present embodiment.

Referring to FIG. 4, the additional coupling portion 54 and the second lower plate 53 are formed by bending a metal piece which is formed by partially cutting the first lower plate 52. The thus-formed second lower plate 53 is coupled to the first lower plate 52 via the additional coupling portion 54. The additional coupling portion 54 of the present embodiment couples the whole front end of the second lower plate 53 to the first lower plate 52. The additional coupling portion 54 and the second lower plate 53 are separated from the other parts of the additional shell 50.

Referring to FIG. 4 together with FIG. 7, the first lower plate 52 extends along the pitch direction and covers the mount portions 314, which are located rearward of the predetermined terminals 306, from below. The first lower plate 52 of the present embodiment covers all the mount portions 314 from below. The second lower plate 53 extends along the pitch direction and covers the connectable portions 342 of the predetermined terminals 306 from below. The second lower plate 53 of the present embodiment covers the connectable portions 342 of all the predetermined terminals 306 from below. The second lower plate 53 is located above the first lower plate 52.

Referring to FIG. 8, the connectable portions 342 of the first portions 34 of the predetermined terminals 306 tend to have relatively high impedance in comparison with the mount portions 314 on which the ground conductors 76 of the first object 70 are mounted. However, according to the present embodiment, the second lower plate 53 of the additional shell 50 is located above the first lower plate 52 and covers the connectable portions 342 of the predetermined terminals 306 from below. In other words, the second lower plate 53 is provided so that it is close to the connectable portions 342. According to this structure, the impedance of the first portion 34, the impedance of the second portion 36 and the impedance of the held portion 32 are further matched with each other, and thereby transmission characteristics can be further improved.

According to the present embodiment, the additional coupling portion 54 and the second lower plate 53 are provided only under the predetermined terminals 306 which transmit high frequency signals. According to this structure, the most part of the lower plate 51 of the additional shell 50 can be formed in a shape which has a flat surface in parallel to the XY-plane. As a result, transmission characteristics can be improved while the connector 10 can be stably mounted on the second object 80. However, the present invention is not limited thereto. For example, the additional coupling portion 54 and the second lower plate 53 may be provided under all the terminals 30. The additional coupling portion 54 and the second lower plate 53 may be provided as necessary.

According to the present embodiment, the additional coupling portion 54 and the second lower plate 53 are formed by cutting and bending a part of the additional shell 50. Moreover, the first lower plate 52, the additional coupling portion 54 and the second lower plate 53 each extending along the pitch direction are seamlessly connected to each other in the front-rear direction. According to this structure, transmission characteristics can be easily improved. However, the present invention is not limited thereto. The structure of each of the first lower plate 52, the additional coupling portion 54 and the second lower plate 53 can be modified as necessary. For example, the second lower plate 53 may be formed by partially drawing or embossing the first lower plate 52.

The present embodiment can be further modified in addition to the already described various modifications. Hereafter, explanation will be made about three modifications of the shell 40.

Figure 16:
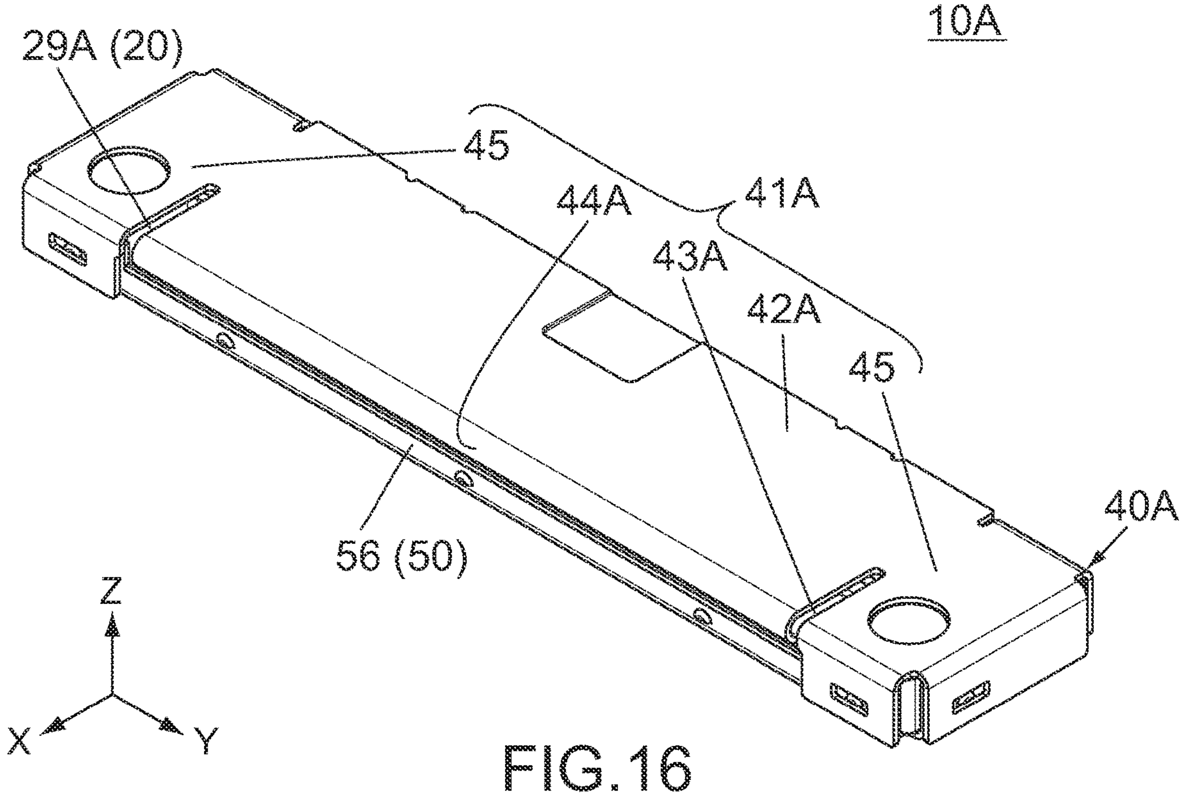
FIG. 16 is a perspective view showing a first modification of the connector of FIG. 3.

Comparing FIG. 16 with FIG. 3, a connector 10A according to a first modification comprises a shell 40A which is different from the shell 40 of the connector 10. Except for this difference, the connector 10A is formed of the same members as those of the connector 10.

The shell 40A has an upper plate 41A which is different from the upper plate 41 of the shell 40. The upper plate 41A has a first upper plate 42A, a second upper plate 43A and a coupling portion 44A which are different from the first upper plate 42, the second upper plate 43 and the coupling portion 44 of the upper plate 41, respectively, and has the two side portions 45 same as those of the upper plate 41. The upper plate 41A has the same structure as that of the upper plate 41 except for the aforementioned differences.

Figure 17:
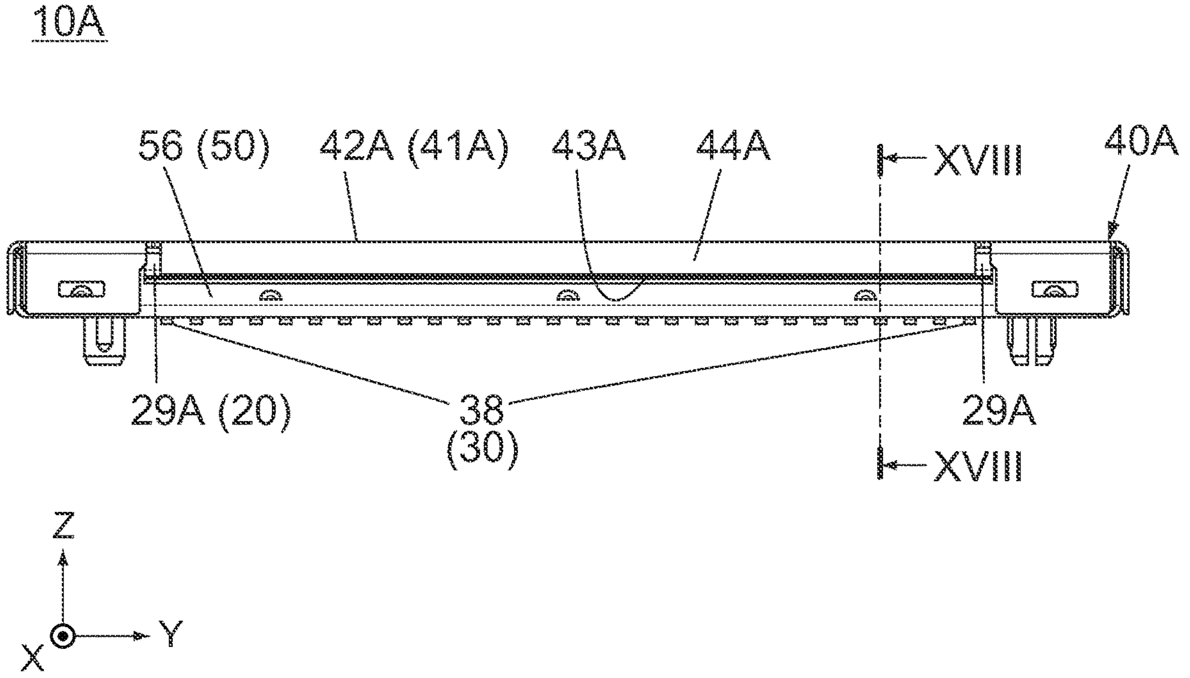
FIG. 17 is a front view showing the connector of FIG. 16.
Figure 18:
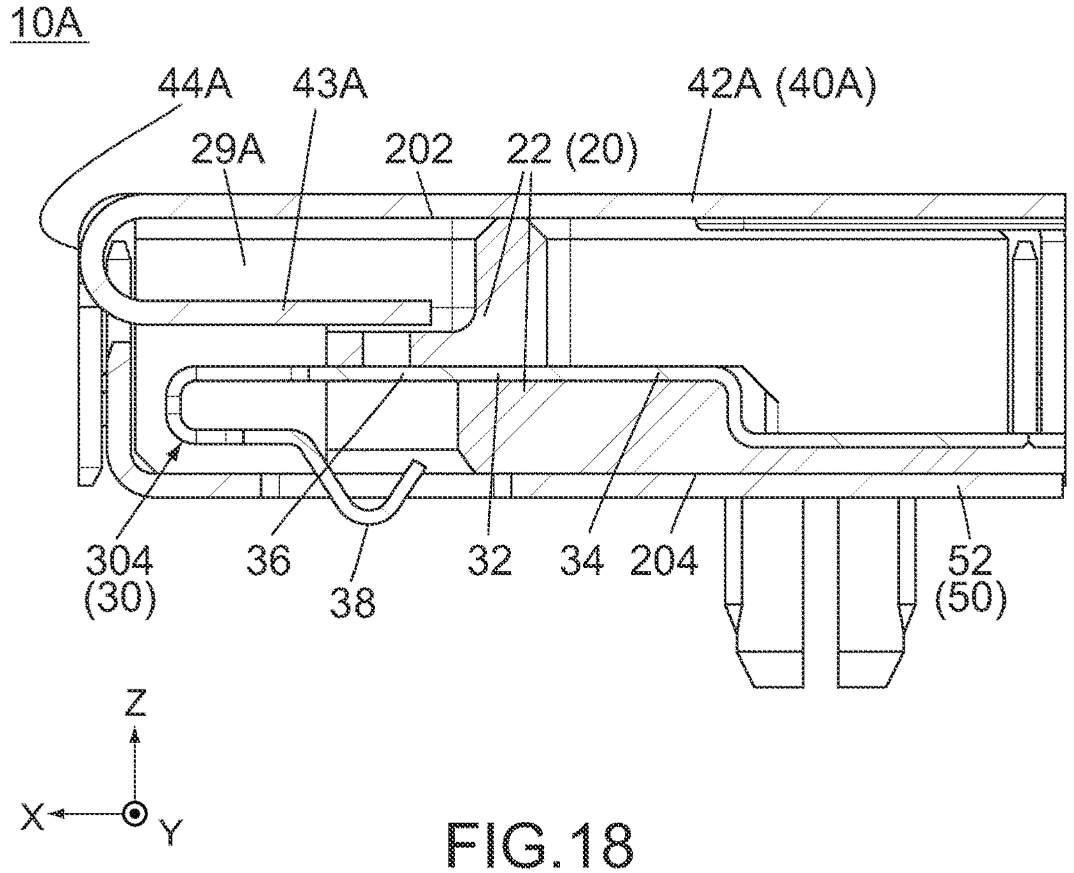
FIG. 18 is a cross-sectional view showing the connector of FIG. 17, taken along line XVIII-XVIII.

Referring to FIGS. 16 to 18, the first upper plate 42A extends over two or more of the terminals 30 along the pitch direction and covers the first portions 34 of the terminals 30 from above in the upper-lower direction. The second upper plate 43A extends over two or more of the terminals 30 along the pitch direction and covers the second portions 36 of the terminals 30 from above. The second upper plate 43A is located below the first upper plate 42A.

The second upper plate 43A and the coupling portion 44A are formed by cutting and bending the first upper plate 42A. The second upper plate 43A is coupled to the first upper plate 42A via the coupling portion 44A. In detail, the coupling portion 44A extends along the pitch direction. The coupling portion 44A is connected to a front end of the first upper plate 42A and is bent back. The second upper plate 43A is connected to a rear end of the coupling portion 44A and extends rearward.

The housing 20 has one or more visible portions 29A. Each of the visible portions 29A is adjacent to the coupling portion 44A. Each of the visible portions 29A is, at least in part, located at the same position as that of the coupling portion 44A in the upper-lower direction and is visible from outside the connector 10A. The one or more visible portions 29A include two visible portions 29A. The two visible portions 29A are located at opposite sides of the coupling portion 44A in the pitch direction, respectively.

According to the aforementioned structure, the impedance of the first portion 34, the impedance of the second portion 36 and the impedance of the held portion 32 are matched with each other, and thereby transmission characteristics can be improved. The present modification provides the compression type connector 10A which can be improved in transmission characteristics.

Figure 19:
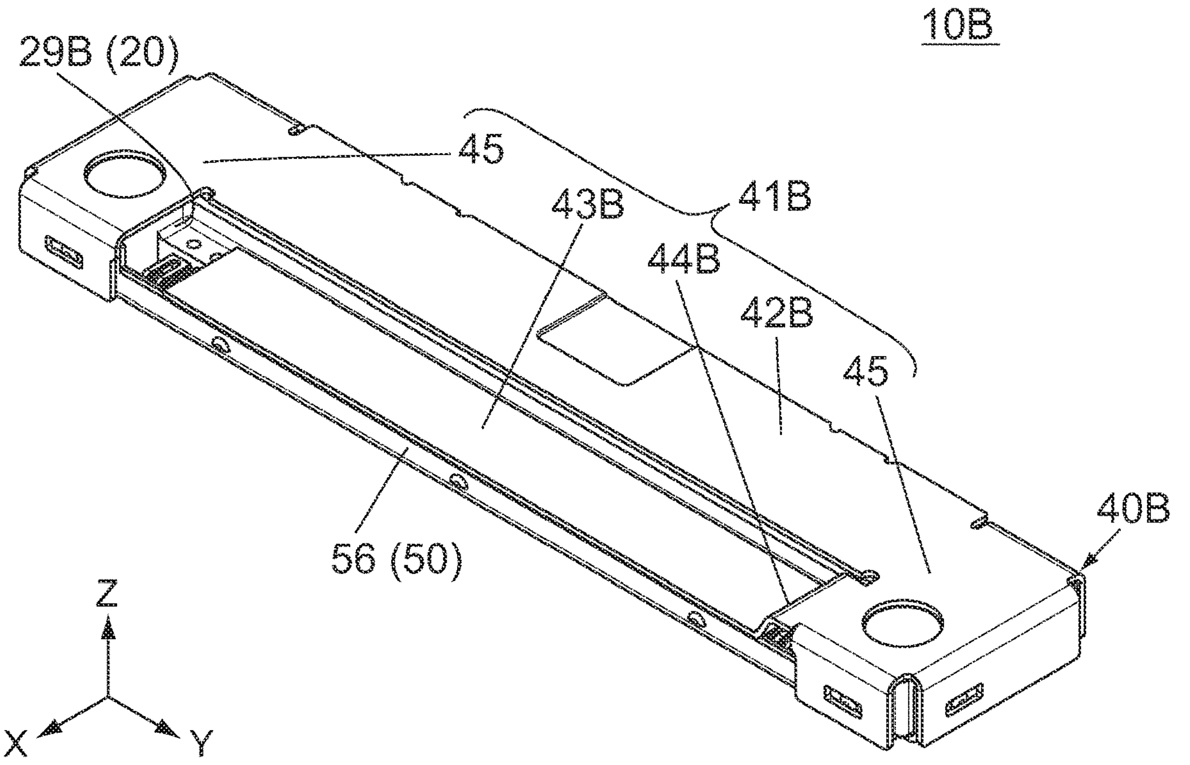
FIG. 19 is a perspective view showing a second modification of the connector of FIG. 3.

Comparing FIG. 19 with FIG. 3, a connector 10B according to a second modification comprises a shell 40B which is different from the shell 40 of the connector 10. Except for this difference, the connector 10B is formed of the same members as those of the connector 10.

The shell 40B has an upper plate 41B which is different from the upper plate 41 of the shell 40. The upper plate 41B has a first upper plate 42B, a second upper plate 43B and a coupling portion 44B which are different from the first upper plate 42, the second upper plate 43 and the coupling portion 44 of the upper plate 41, respectively, and has the two side portions 45 same as those of the upper plate 41. The upper plate 41B has the same structure as that of the upper plate 41 except for the aforementioned differences.

Figure 20:
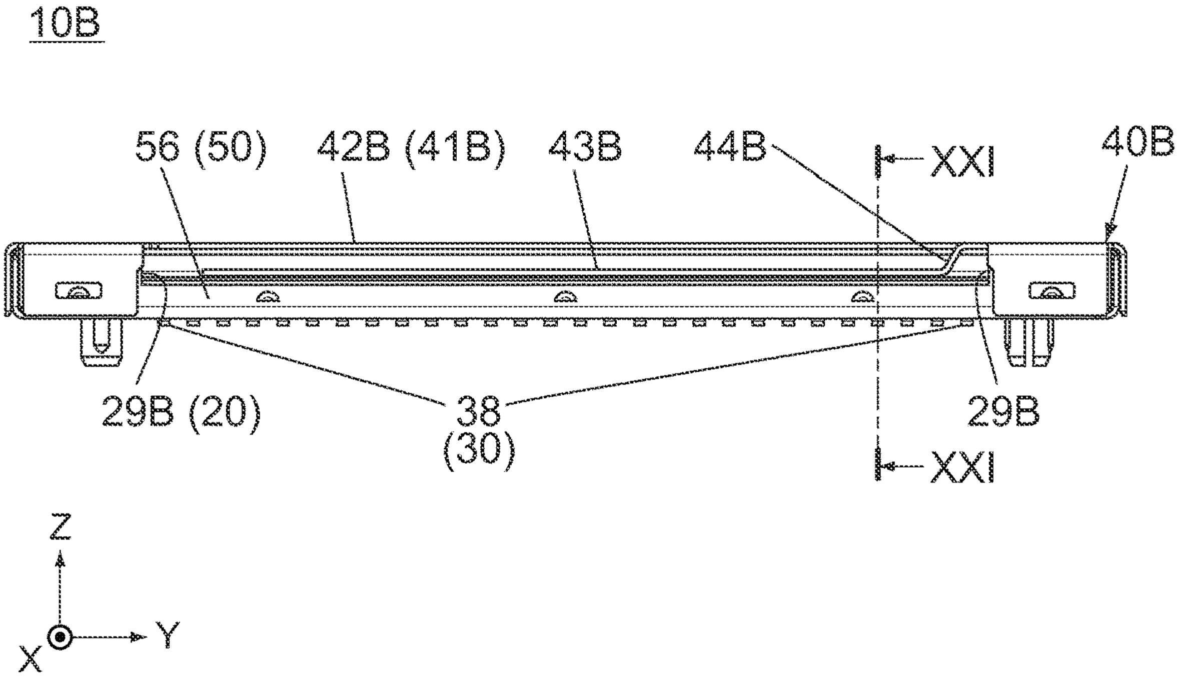
FIG. 20 is a front view showing the connector of FIG. 19.
Figure 21:
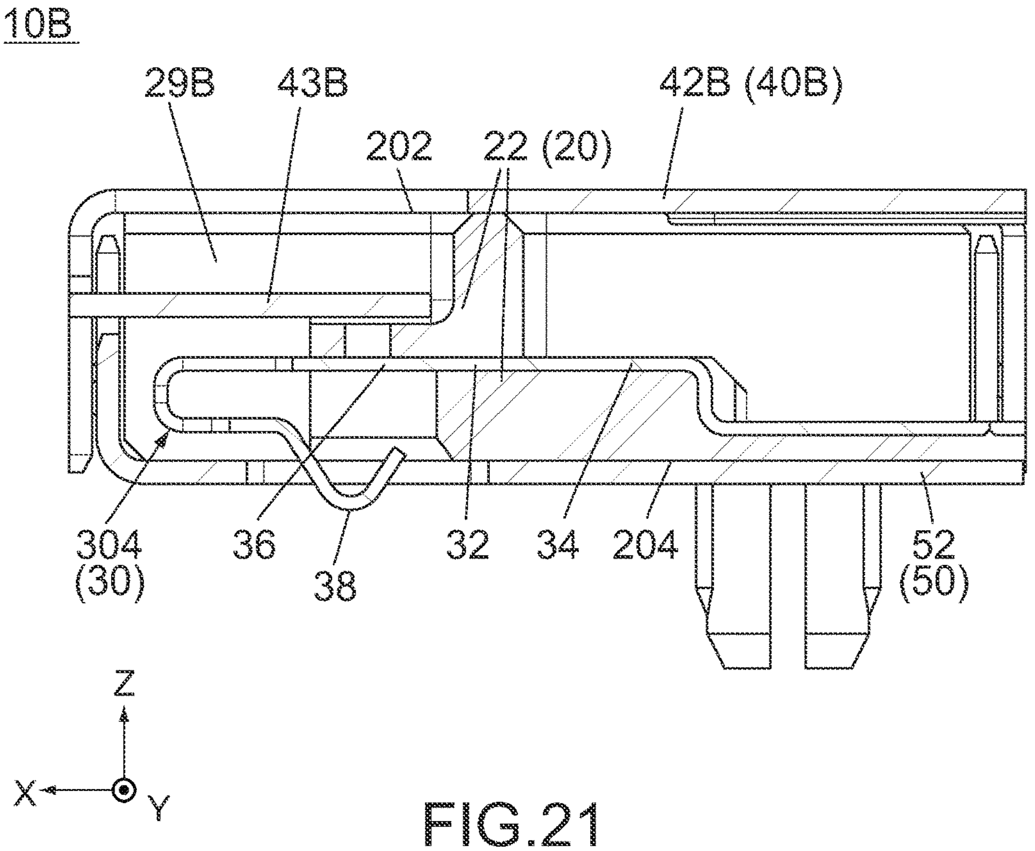
FIG. 21 is a cross-sectional view showing the connector of FIG. 20, taken along line XXI-XXI.

Referring to FIGS. 19 to 21, the first upper plate 42B extends over two or more of the terminals 30 along the pitch direction and covers the first portions 34 of the terminals 30 from above in the upper-lower direction. The second upper plate 43B extends over two or more of the terminals 30 along the pitch direction and covers the second portions 36 of the terminals 30 from above. The second upper plate 43B is located below the first upper plate 42B.

The second upper plate 43B and the coupling portion 44B are formed by cutting and bending the upper plate 41B. The second upper plate 43B is coupled to the first upper plate 42B via the coupling portion 44B. In detail, the coupling portion 44B extends along the front-rear direction. The coupling portion 44B is connected to an inside edge of one of the two side portions 45 in the pitch direction and extends downward and inward in the pitch direction. The second upper plate 43B is connected to a lower end of the coupling portion 44B and extends along the pitch direction.

The housing 20 has one or more visible portions 29B. One of the visible portions 29B is adjacent to the coupling portion 44B. Each of the visible portions 29B is, at least in part, located at the same position as that of the coupling portion 44B in the upper-lower direction and is visible from outside the connector 10B. The one or more visible portions 29B include two visible portions 29B. The two visible portions 29B are located at opposite sides of the second upper plate 43B in the pitch direction, respectively.

According to the aforementioned structure, the impedance of the first portion 34, the impedance of the second portion 36 and the impedance of the held portion 32 are matched with each other, and thereby transmission characteristics can be improved. The present modification provides the compression type connector 10B which can be improved in transmission characteristics.

Figure 22:
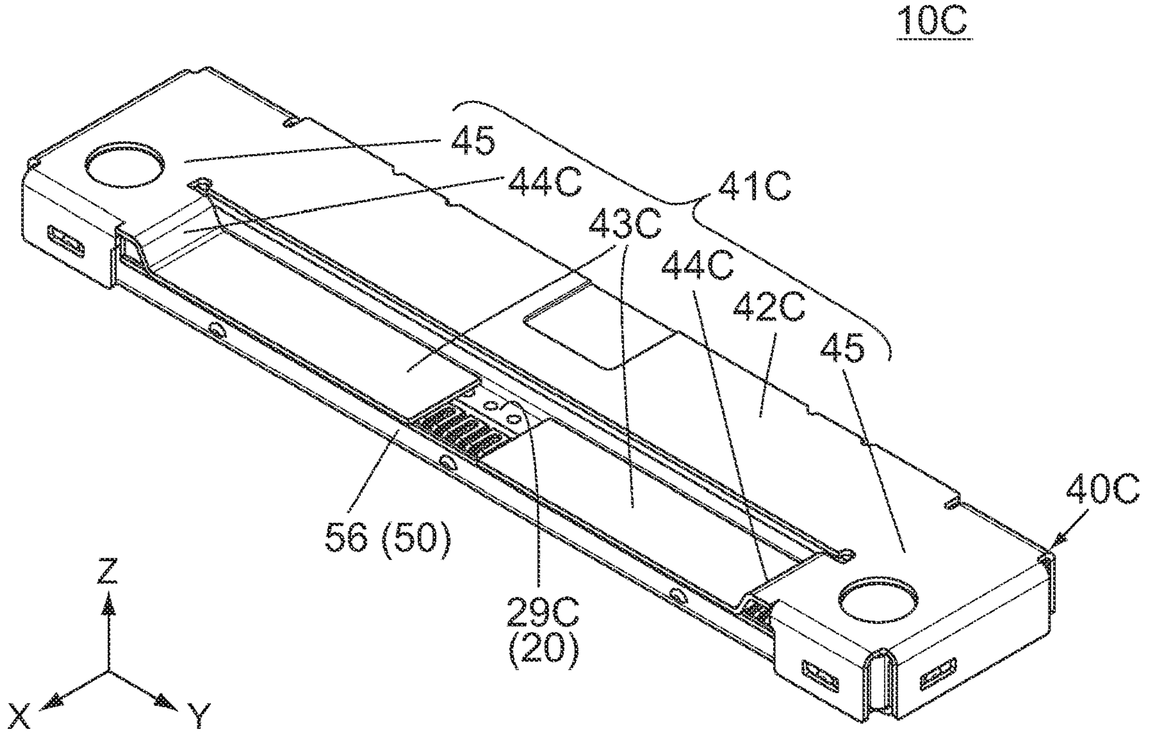
FIG. 22 is a perspective view showing a third modification of the connector of FIG. 3.

Comparing FIG. 22 with FIG. 3, a connector 10C according to a third modification comprises a shell 40C which is different from the shell 40 of the connector 10. Except for this difference, the connector 10C is formed of the same members as those of the connector 10.

The shell 40C has an upper plate 41C which is different from the upper plate 41 of the shell 40. The upper plate 41C has a first upper plate 42C, two second upper plates 43C and two coupling portions 44C which are different from the first upper plate 42, the second upper plate 43 and the coupling portion 44 of the upper plate 41, respectively, and has the two side portions 45 same as those of the upper plate 41. The upper plate 41C has the same structure as that of the upper plate 41 except for the aforementioned differences.

Figure 23:
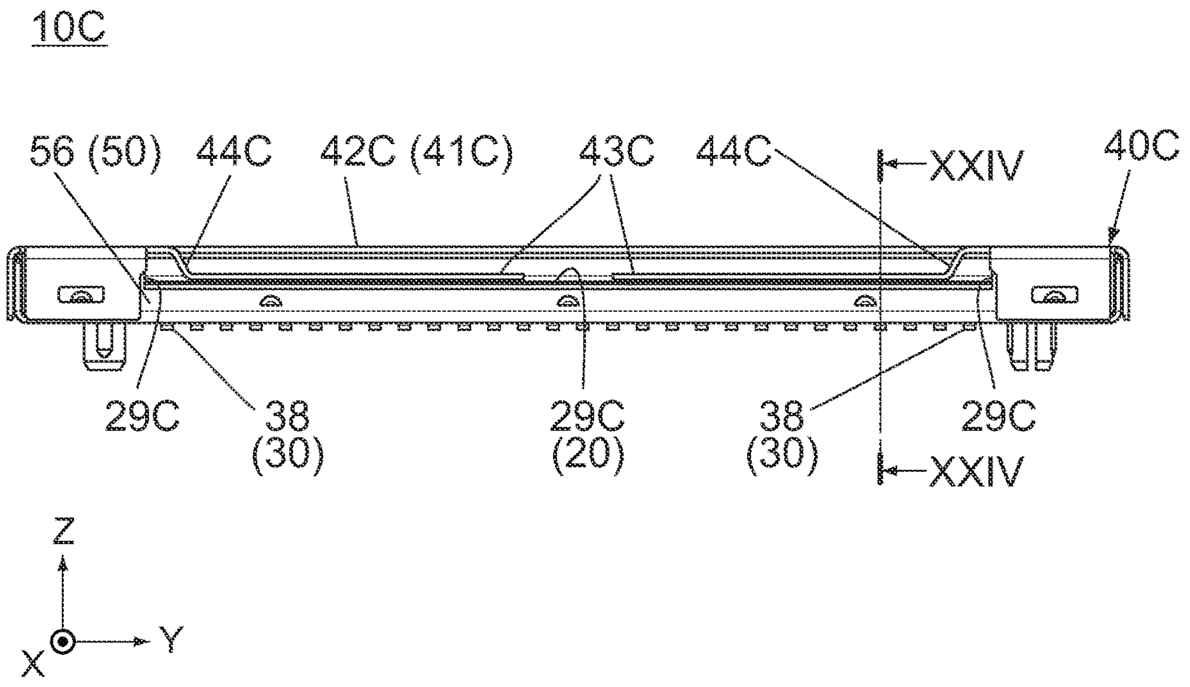
FIG. 23 is a front view showing the connector of FIG. 22.
Figure 24:
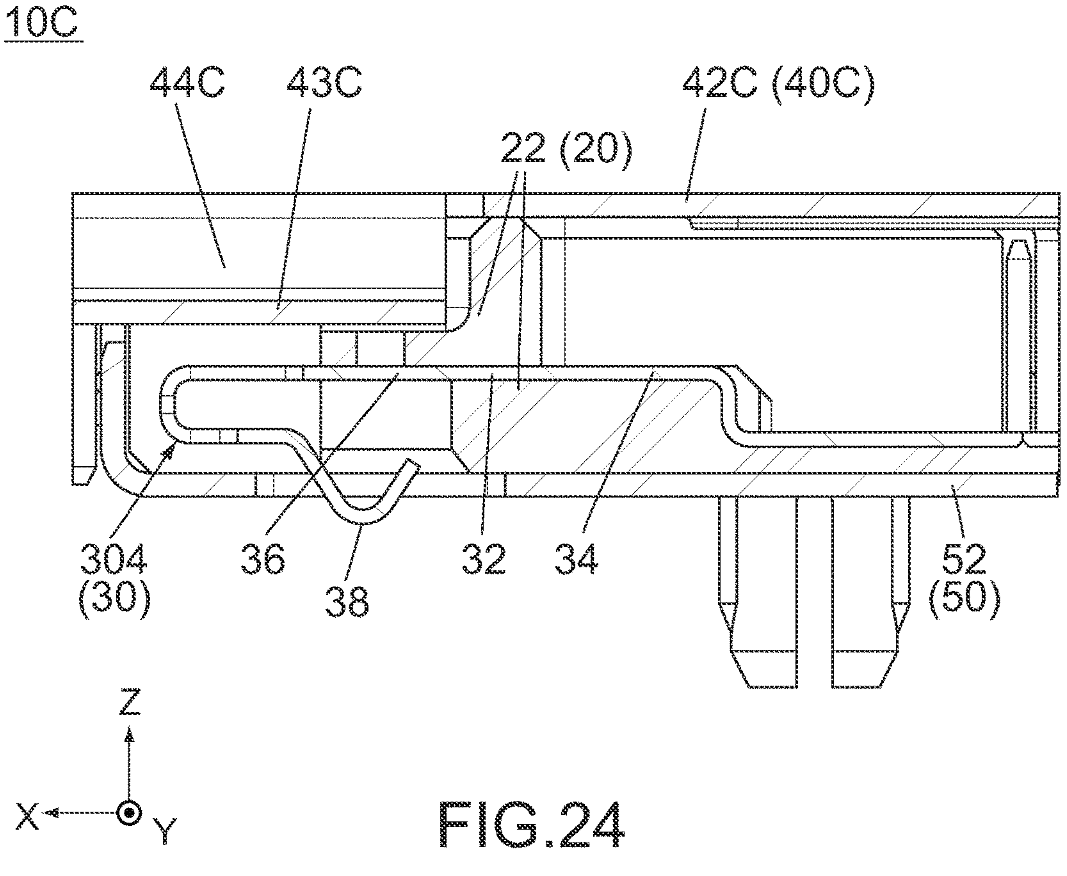
FIG. 24 is a cross-sectional view showing the connector of FIG. 23, taken along line XXIV-XXIV.
Figure 25:
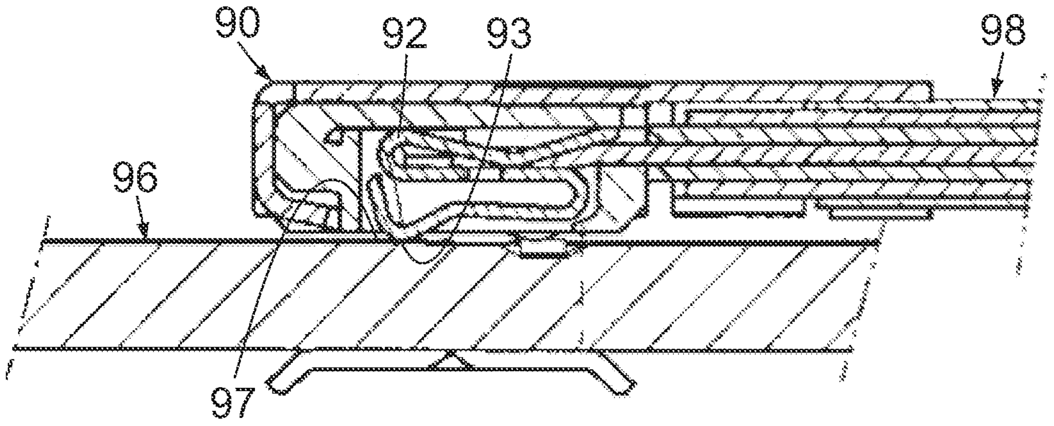
FIG.25 (PRIOR ART)
FIG. 25 is a cross-sectional view showing a connector of Patent Document 1.

Referring to FIGS. 22 to 24, the first upper plate 42C extends over two or more of the terminals 30 along the pitch direction and covers the first portions 34 of the terminals 30 from above in the upper-lower direction. Each of the second upper plates 43C extends over two or more of the terminals 30 along the pitch direction and covers the second portions 36 of the terminals 30 from above. Each of the second upper plates 43C is located below the first upper plate 42C.

According to the present modification, two sets each consisting of one of the second upper plates 43C and one of the coupling portions 44C are provided. Each set is formed by cutting and bending the upper plate 41C. For each set, the second upper plate 43C is coupled to the first upper plate 42C via the coupling portion 44C. In detail, each of the coupling portions 44C extends along the front-rear direction. Each of the coupling portions 44C is connected to an inside edge of one of the two side portions 45 in the pitch direction and extends downward and inward in the pitch direction. Each of the second upper plates 43C is connected to a lower end of the coupling portion 44C and extends along the pitch direction. Thus, the two second upper plates 43C extend from the two side portions 45, respectively, toward each other along the pitch direction.

The housing 20 has one or more visible portions 29C. The one or more visible portions 29C include two visible portions 29C. The two visible portions 29C are adjacent to the coupling portions 44C, respectively. Each of the two visible portions 29C is, at least in part, located at the same position as that of the coupling portion 44C in the upper-lower direction and is visible from outside the connector 10C. The two visible portions 29C are located outward of the two second upper plates 43C in the pitch direction, respectively. The one or more visible portions 29C include one visible portion 29 which is located between the two second upper plates 43C in the pitch direction in addition to the aforementioned two visible portions 29C.

According to the aforementioned structure, the impedance of the first portion 34, the impedance of the second portion 36 and the impedance of the held portion 32 are matched with each other, and thereby transmission characteristics can be improved. The present modification provides the compression type connector 10C which can be improved in transmission characteristics.

Referring to FIG. 3, the second upper plate 43 of the connector 10 is grounded to the second object 80 (see FIG. 1) through the front plates 46 and the additional shell 50. In contrast, each of the second upper plate 43A (see FIG. 18), the second upper plate 43B (see FIG. 19) and the second upper plates 43C (see FIG. 22) of the aforementioned modifications is not connected to any part which is configured to be grounded to the second object 80 and forms a stub in a transmission path of a ground signal. Accordingly, considering transmission characteristics, the structure of the connector 10 is preferable than those of the connectors 10A to 10C of the modifications unless there is a specific reason.

What is claimed is:

1. A connector connectable to a first object and fixable on a second object so that the connector is unmovable relative to the second object, wherein:

the connector comprises a housing, two or more terminals and a shell;

the housing has a holding portion;

the terminals are arranged in a pitch direction;

each of the terminals has a held portion, a first portion and a second portion;

for each of the terminals, the held portion is held by the holding portion, the first portion extends rearward from the holding portion in a front-rear direction perpendicular to the pitch direction, and the second portion extends forward from the holding portion;

the first portion has a connectable portion;

the connectable portion is configured to be connected to the first object;

the second portion has a support portion and a contact portion;

the support portion is resiliently deformable;

the contact portion is supported by the support portion and is pressed against the second object when the connector is fixed on the second object;

the shell covers, at least in part, an upper surface of the housing;

the shell has a first upper plate, a second upper plate and a coupling portion;

the second upper plate is coupled to the first upper plate via the coupling portion;

the first upper plate extends over the two or more terminals along the pitch direction and covers the first portions of the terminals from above in an upper-lower direction perpendicular to both the pitch direction and the front-rear direction;

the second upper plate extends over the two or more terminals along the pitch direction and covers the second portions of the terminals from above; and the second upper plate is located below the first upper plate.

2. The connector as recited in claim 1, wherein the first object is one or more cables.

3. The connector as recited in claim 2, wherein:

the cables include one or more predetermined cables;

each of the predetermined cables has a ground conductor;

the terminals include one or more predetermined terminals which correspond to the predetermined cables, respectively;

the predetermined terminals are provided with mount portions, respectively;

each of the mount portions is apart from and is located rearward of the first portion of the predetermined terminal; and each of the ground conductors is configured to be mounted on and connected to the mount portion which is located rearward of a corresponding one of the predetermined terminals.

4. The connector as recited in claim 3, wherein each of the mount portions is located below the connectable portion of the predetermined terminal.

5. The connector as recited in claim 3, wherein:

the connector comprises an additional shell;

the additional shell covers, at least in part, a lower surface of the housing;

the additional shell has a first lower plate, a second lower plate and an additional coupling portion;

the second lower plate is coupled to the first lower plate via the additional coupling portion;

the first lower plate extends along the pitch direction and covers the mount portions, which are located rearward of the predetermined terminals, from below;

the second lower plate extends along the pitch direction and covers the connectable portions of the predetermined terminals from below; and the second lower plate is located above the first lower plate.

6. The connector as recited in claim 1, wherein:

the housing has one or more visible portions; and each of the visible portions is adjacent to the coupling portion, is located at a position which is, at least in part, same as that of the coupling portion in the upper-lower direction and is visible from outside the connector.

7. The connector as recited in claim 6, wherein:

the coupling portion is located between the first upper plate and the second upper plate in the front-rear direction and extends along the pitch direction;

the one or more visible portions include two visible portions; and the two visible portions are located at opposite sides of the coupling portion in the pitch direction, respectively.

8. The connector as recited in claim 1, wherein:

the housing has an interposed portion;

the interposed portion extends forward from the holding portion and partially covers the second portion of each of the terminals;

an upper end of the interposed portion is located below an upper end of the holding portion; and the interposed portion is interposed between the second upper plate and the second portions.

9. The connector as recited in claim 1, wherein:

the second portion of each of the terminals has an extending portion and a bent portion;

the extending portion extends forward from the holding portion;

the bent portion is connected to a front end of the extending portion and is bent back;

the support portion extends rearward from the bent portion; and the contact portion faces downward.

* * * * *